United States Patent
Delgado

(10) Patent No.: US 11,641,279 B2
(45) Date of Patent: *May 2, 2023

(54) SECURE DIGITAL INFORMATION INFRASTRUCTURE

(71) Applicant: Oasis Medical, Inc., Glendora, CA (US)

(72) Inventor: Norman Craig Delgado, Claremont, CA (US)

(73) Assignee: Oasis Medical, Inc., Glendora, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,113

(22) Filed: Mar. 25, 2021

(65) Prior Publication Data
US 2022/0045862 A1    Feb. 10, 2022

Related U.S. Application Data

(63) Continuation of application No. 17/026,824, filed on Sep. 21, 2020, now Pat. No. 10,979,228, which is a
(Continued)

(51) Int. Cl.
*H04L 9/32* (2006.01)
*H04L 9/08* (2006.01)
*H04L 9/40* (2022.01)

(52) U.S. Cl.
CPC .......... *H04L 9/3226* (2013.01); *H04L 9/0863* (2013.01); *H04L 9/3213* (2013.01)

(58) Field of Classification Search
CPC ... H04L 9/3226; H04L 9/0863; H04L 9/3213; H04L 9/0894; H04L 63/0428; H04L 63/08
See application file for complete search history.

(56) References Cited

U.S. PATENT DOCUMENTS 8,160,966 B2    4/2012   Al-Herz
8,972,750 B2    3/2015   Goel et al.
(Continued)

FOREIGN PATENT DOCUMENTS

WO    WO 2013/090211 A2    6/2013
WO    WO 2015/122813 A1    8/2015

OTHER PUBLICATIONS

International Search Report and Written Opinion dated Jan. 22, 2021, received in International Patent Application No. PCT/US2020/053850, in 12 pages.

*Primary Examiner* — Darren B Schwartz
(74) *Attorney, Agent, or Firm* — Knobbe, Martens, Olson & Bear LLP

(57) ABSTRACT

An authentication and encryption computer system is disclosed including processing devices, a network interface, and a data store. The authentication and encryption system is configured to maintain in the data store content common to a plurality of entities and content independently specified by each of the plurality of entities. The system is configured to receive a content request from an application executing on a mobile device, the content request comprising a secure access code corresponding to an entity, and the content request encrypted by the mobile device. An interface, comprising the content common to the plurality of entities, is customized to include content independently specified by the entity, wherein the content independently specified by the entity comprises a token value. A user request for an item presented via the interface is received and the token value is transferred to the entity.

24 Claims, 20 Drawing Sheets

Related U.S. Application Data continuation-in-part of application No. 16/861,035, filed on Apr. 28, 2020, now Pat. No. 11,296,884, which is a continuation of application No. 16/598,607, filed on Oct. 10, 2019, now Pat. No. 10,652,022.

(56) References Cited

U.S. PATENT DOCUMENTS

| | | |
|---|---|---|
| 9,524,399 B1 | 12/2016 | Takahashi |
| 9,819,665 B1 | 11/2017 | Machani |
| 10,652,022 B1 | 5/2020 | Delgado |
| 10,757,007 B1* | 8/2020 | Walters .............. H04L 63/0478 |
| 2002/0002538 A1 | 1/2002 | Ling |
| 2004/0001087 A1 | 1/2004 | Warmus et al. |
| 2004/0133587 A1 | 7/2004 | Matsumoto |
| 2005/0080667 A1 | 4/2005 | Knott et al. |
| 2005/0254514 A1 | 11/2005 | Lynn |
| 2006/0107040 A1 | 5/2006 | Fiske |
| 2006/0224513 A1 | 10/2006 | Kawamoto |
| 2007/0162961 A1 | 7/2007 | Tarrance |
| 2007/0276765 A1 | 11/2007 | Hazel et al. |
| 2008/0082540 A1 | 4/2008 | Weissman |
| 2008/0091796 A1 | 4/2008 | Story et al. |
| 2008/0189214 A1* | 8/2008 | Mueller ................. G06Q 20/20 705/72 |
| 2009/0235303 A1 | 9/2009 | Yamaoka et al. |
| 2010/0142711 A1 | 6/2010 | Weis |
| 2010/0185868 A1 | 7/2010 | Grecia |
| 2010/0235284 A1 | 9/2010 | Moore |
| 2010/0312636 A1* | 12/2010 | Coulter ............. G06Q 30/0238 705/44 |
| 2011/0211689 A1 | 9/2011 | von Mueller et al. |
| 2012/0151220 A1 | 6/2012 | Grecia |
| 2012/0284642 A1 | 11/2012 | Sitrick |
| 2013/0036476 A1 | 2/2013 | Roever |
| 2014/0122331 A1 | 5/2014 | Vaish |
| 2014/0245022 A1 | 8/2014 | Bister et al. |
| 2014/0304778 A1 | 10/2014 | Grecia |
| 2014/0351589 A1 | 11/2014 | Chenna |
| 2016/0036808 A1 | 2/2016 | Li |
| 2016/0239836 A1 | 8/2016 | von Mueller et al. |
| 2017/0048170 A1 | 2/2017 | Smullen |
| 2017/0054726 A1 | 2/2017 | Friedmann |
| 2017/0200155 A1* | 7/2017 | Fourez .................. G06Q 20/34 |
| 2018/0053157 A1 | 2/2018 | Roffey |
| 2019/0130391 A1 | 5/2019 | Wright |
| 2019/0200218 A1 | 6/2019 | Redberg |
| 2020/0082360 A1 | 3/2020 | Regev |
| 2020/0151716 A1 | 5/2020 | Madisetti |

* cited by examiner

Doctors

| First Name | Last Name | Pin | Email | JDE ID | Confirmation | Approval | NLR Approval | Member Since | Edit |
|---|---|---|---|---|---|---|---|---|---|
| Denise | Starbird | 5155 | Denise.starbird@yahoo.com | 806160 | Confirmed | Pending | Pending | August 20, 2019 | ✎ |
| Kyle | Paulus | 7996 | favre4lifeeee@yahoo.com | 805491 | Confirmed | Approved | Approved | July 24, 2019 | ✎ |
| Sarah | Viggers | 7291 | sarah.viggers@yahoo.com | 806127 | Confirmed | Approved | Approved | August 14, 2019 | ✎ |

Show 10 entries

Search: yahoo

Showing 1 to 3 of 3 entries (filtered from 69 total entries)

Previous 1 Next

| | | 3:58PM | | | | | |
|---|---|---|---|---|---|---|---|
| Profile View More ↑ | | DASHBOARD | | Patients | | View More ↑ | |
| OASIS Medical, Inc.<br>noreply@oasismedical.com | | Sales Records View More ↑<br>$0.00 | | | | 0 Patient(s)<br>0 recent subscriber(s) | |
| Products | | Product Code | Category | Unit Price | Selling Price | | Display |
|  | Oasis TEARS Preservative - Free Lubricating Eye Drops | OT6100 | No Category | $12.00 | $20.00 | | ⊚ |
|  | Oasis TEARS PLUS Preservative-Free Lubricatin... | OT6200 | No Category | $14.00 | $22.00 | | ⊚ |
| 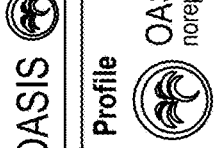 | Oasis TEARS PF Preservative - Free Lubricating Eye Drops | OT6400 | No Category | $14.00 | $22.00 | | ⊚ |
|  | Oasis TEARS Lubricating Eye Drops (Preserved) | OT6310 | No Category | $10.00 | $18.00 | | ⊚ |
|  | Oasis REST & RELIEF Eye Mask (Hot/Cold) | OM8000 | No Category | $12.50 | $25.00 | | ⊚ |

8 Product(s)

FIG. 4C

CONSUMERS

< Back

| Name | ID# | Email | Shipping Address |
|------|-----|-------|------------------|

FIG 4E

< Back

PROFILE

○ Profile Info

| Full Name: | Denise Starbird | Email: | Denise.starbird@yahoo.com |
| Password: | ********** | PIN Code: | 5155 |
| Profile Image: | [image] Change Image | Stone Image: | [image] Change Image |
| Tax Exempt Certificate Number | 12345 | Business Name: | Body Eye |

☏ Contact Us   ◎ MY OASIS
📞 (844) 820-8940
✉ support@oasismedical.com

FIG 4F

| | | Description | Price | Edit | Disabled |
|---|---|---|---|---|---|
| $ | Products | | | | |
| ◊ | Categories | | | | |
| | Partner Type | TEARS Hypochlorous | Oasis TEARS Hypochlorous | $30.00 | ✎ | |
| | Buying Group | REST & RELIEF Eye Mask (Hot/Cold) | Oasis REST & RELIEF® Eye Mask is a soft cloth eye mask cloth with an adjustable strap to secure the mask and deliver light compression for a comfortable fit. The eye mask can be used hot for the relief of dry eye symptoms, or cold for swelling. The beads within the mask conform to your face. See instructions for use for care. | $25.00 | ✎ | |
| | Transactions | TEARS OMEGA 3 - Coming Soon | Oasis TEARS OMEGA 3 | $40.00 | ✎ | |
| ♔ | Consumers | TEARS VISION Supplement - Coming Soon | For General Eye Health | $1000.00 | ✎ | |
| | Doctors | TEARS Preservative-Free Lubricating Eye Drops | Preservative-Free Lubricating Eye Drops for the relief of mild dry eye symptoms. 30 single use vials. | $22.00 | ✎ | |
| | Recurring Orders | TEARS PLUS Preservative-Free Lubricating Eye | Preservative-Free Lubricating Eye Drops for the relief of severe dry eye symptoms. 30 single use vials. | $16.00 | ✎ | |
| ⚿ | Admin | TEARS Lubricating Eye Drops (preserved) | Lightly preserved lubricating eye Drops for the relief of mild dry eye symptoms | $10.00 | ✎ | |
| | | TEARS PF Preservative-free Lubricating Eye Drops | Preservative-Free Lubricating Eye Drops in a bottle for the relief of mild dry eye symptoms. Proprietary bottle designed for preservative-free sterility. Discard 90 days after opening. | $25.00 | ✎ | |
| | | Lid & Lash Gel Cleanser | | $0.00 | ✎ | ⟩ |
| | | Lid & Lash Wipes | | $0.00 | ✎ | ⟩ |
| | | Lid & Lash Tea Tree Oil | Testing 404 error | $10.00 | ✎ | |

SECURE DIGITAL INFORMATION INFRASTRUCTURE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field of the Invention

The present disclosure relates to network and data security.

Description of the Related Art

Conventionally, websites that receive, process, and secure data each need to have their own security infrastructure, their own webpage content, and their own data processing processes. Such implementations increase the chance of hacker intrusions, while also necessitating disadvantageously large amounts of repetitive hardware and software.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An authentication, encryption, and content distribution computer system is disclosed including processing devices, a network interface, and a data store. The authentication, encryption, and content distribution system is configured to maintain in the data store content common to a plurality of entities and content independently specified by each of the plurality of entities. The system is configured to receive a content request from an application executing on a device (e.g., a mobile device or other system), the content request comprising a secure security access code corresponding to an entity, and the content request encrypted by the device. An interface, comprising the content common to the plurality of entities, is customized to include content independently specified by the entity, wherein the content independently specified by the entity optionally comprises a token value. A user request for an item presented via the interface is received and the token value is transferred to the entity. The secure security access code may be generated using a seeded random number generator.

An aspect of the present disclosure relates to an authentication and encryption computer system, the authentication and encryption computer system comprising: one or more processing devices; a network interface; non-transitory memory that stores instructions that when executed by the one or more processing devices are configured to cause the computer system to perform operations comprising: generate unique security access codes for respective entities in a first plurality of entities; maintain a data store comprising: the generated security access codes with an indication as to which of the generated security access codes is associated with which entity in the first plurality of entities; first common content common to the first plurality of entities; and content independently specified by each of the first plurality of entities; receive an encrypted first content request from an application executing on a first mobile user device of a first user, the first content request encrypted by the first mobile user device, the first content request comprising a first security access code, the first security access code corresponding to a first entity of the first plurality of entities; in response to receiving the first content request: decrypt, using a first key, the received first content request comprising the first security access code; determine that the received first security access code is associated with the first entity; cause a first user interface, comprising at least a portion of the first common content common to the first plurality of entities, to be customized to include content independently specified by the first entity, wherein the first common content common to the first plurality of entities comprises item data for a first item and wherein the content independently specified by the first entity comprises a first token value; receive from the first mobile user device a first user request for the first item presented via the first user interface; enable a first instantiation of the first item to be transferred from a first repository to the first user; receive an encrypted second content request from an application executing on a second mobile user device of a second user, the second content request encrypted by the second mobile user device, the second content request comprising a second security access code, the second security access code corresponding to a second entity of the first plurality of entities; in response to receiving the second content request: decrypt the received second content request comprising the second security access code; determine that the received second security access code is associated with the second entity; cause the first user interface, comprising at least a portion of the first common content common to the first plurality of entities, to be customized to include content independently specified by the second entity, wherein the first common content common to the first plurality of entities comprises item data for the first item and wherein the content independently specified by the second entity comprises a second token value; receive from the second mobile user device a second user request for the first item presented via the first user interface; enable a second instantiation of the first item to be transferred from the same first repository to the second user.

An aspect of the present disclosure relates to a computer-implemented method comprising: generating unique security access codes for respective entities in a first plurality of entities; maintaining a data store comprising: first common content common to the first plurality of entities; and content independently specified by each of the first plurality of entities; receiving an encrypted first content request from a first user device of a first user, the first content request comprising a first security access code, the first security access code corresponding to a first entity of the first plurality of entities; in response to receiving the first content request: decrypting, using a first key, the received first content request comprising the first security access code; determining that the received first security access code is associated with the first entity; causing a first user interface, comprising at least a portion of the first common content common to the first plurality of entities, to be customized to include content independently specified by the first entity, wherein the first common content common to the first plurality of entities comprises item data for a first item and wherein the content independently specified by the first entity comprises a first token value; receiving from the first user device a first user request for the first item presented via the first user interface; enabling a first instantiation of the first item to be transferred from a first repository to the first user; receiving an encrypted second content request from a second user device of a second user, the second content request comprising a second security access code, the second security access code corresponding to a second entity of the first plurality of entities; in response to receiving the second content request: decrypting the received second content request comprising the second security access code; determining that the received second security access code is associated with the second entity; causing the first user interface, comprising at least a portion of the first common content common to the first plurality of entities, to be customized to include content independently specified by the second entity, wherein the first common content common to the first plurality of entities comprises item data for the first item and wherein the content independently specified by the second entity comprises a second token value; receiving from the second user device a second user request for the first item presented via the first user interface; enabling a second instantiation of the first item to be transferred from the same first repository to the second user.

An aspect of the present disclosure relates to non-transitory computer readable data media that stores computer executable instructions that when executed by a computing device, cause the computing device to perform operations comprising: generating unique security access codes for respective entities in a first plurality of entities; maintaining a data store comprising: first common content common to the first plurality of entities; and content independently specified by respective entities of the first plurality of entities; receiving a first content request from a first user device of a first user, the first content request comprising a first security access code, the first security access code corresponding to a first entity of the first plurality of entities; in response to receiving the first content request: determining that the received first security access code is associated with the first entity; causing a first user interface, comprising at least a portion of the first common content common to the first plurality of entities, to be customized to include content independently specified by the first entity, wherein the first common content common to the first plurality of entities comprises item data for a first item and wherein the content independently specified by the first entity comprises a first token value; receiving from the first user device a first user request for the first item presented via the first user interface; enabling a first instantiation of the first item to be transferred from a first repository to the first user; receiving a second content request from a second user device of a second user, the second content request comprising a second security access code, the second security access code corresponding to a second entity of the first plurality of entities; in response to receiving the second content request: determining that the received second security access code is associated with the second entity; causing the first user interface, comprising at least a portion of the first common content common to the first plurality of entities, to be customized to include content independently specified by the second entity, wherein the first common content common to the first plurality of entities comprises item data for the first item and wherein the content independently specified by the second entity comprises a second token value; receiving from the second user device a second user request for the first item presented via the first user interface; enabling a second instantiation of the first item to be transferred from the same first repository to the second user.

{TO BE COMPLETED ONCE CLAIMS ARE FINALIZED}

BRIEF DESCRIPTION OF THE DRAWINGS

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

FIGS. 3A-3I illustrate example user interfaces.
FIGS. 4A-4H illustrate additional example user interfaces.

DETAILED DESCRIPTION

Figure 1A:
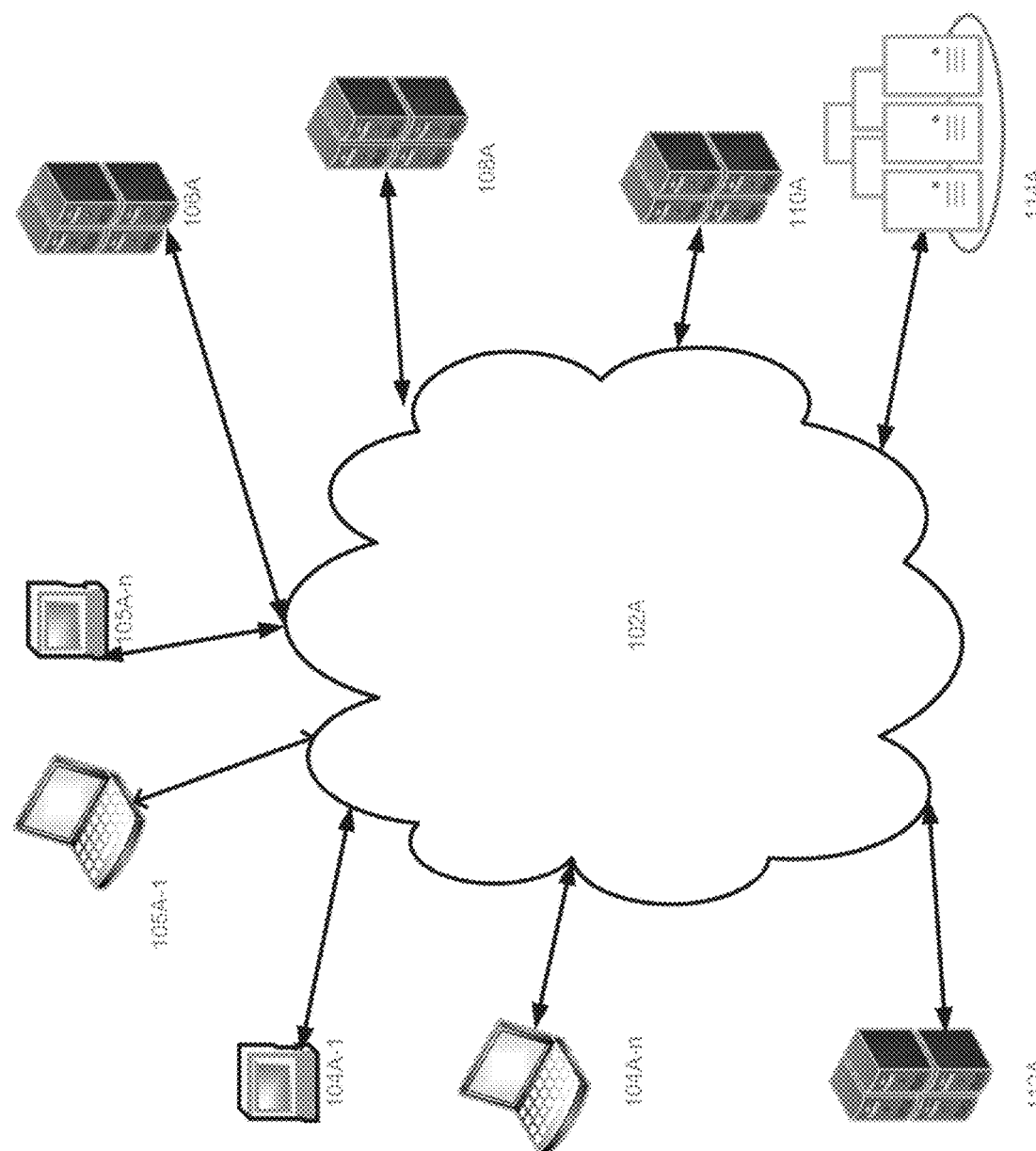
FIG. 1A illustrates an example environment.

Described herein is a secure digital information infrastructure. An aspect of the disclosure relates to the utilization of a secure digital information infrastructure.

As will be described in greater detail herein, an aspect of the disclosure relates to a distributed cloud-based computing system comprising a plurality of cloud servers is configured to securely store and distribute respective custom content associated with corresponding respective different entities. In addition, the cloud-based computing system may store content that is common to the different entities. The cloud-based computing system may provide authentication and encryption services.

Thus, rather than each entity having to receive, process, and secure data, and store repetitive content, a common system may be utilized to store and render entity-specified content in conjunction with content common to multiple entities, and to ensure the provision of entity-specified content is provided only to those having appropriate security codes. The disclosed methods and systems may be utilized to decrease the chance of hacker intrusions, while also reducing the amount of repetitive, duplicative hardware and software that would otherwise be needed.

The custom content associated with a given respective entity may be specified by the specified entity. Access controls may be provided which restrict specification of the custom content associated with the respective entity to authorized users associated with the respective entity.

In addition, products or other items being offered by the respective different entities may include a common product manufactured by a common manufacturer and stored at a common storage facility.

As described in greater detail elsewhere herein, a cloud-based computing system may detect a request from a user system for content associated with a network resource locator (e.g., a uniform resource locator (URL)). An interface may be provided to the user system via which a user may enter an access code (e.g., a secure security access code) corresponding to a given entity. The given entity may have provided/transmitted the secure security access code directly to the user, or may have provided the cloud-based computing system with an electronic address of the user (e.g., email address, messaging service address, or the like), and the cloud-based computing system may transmit the security access code to the electronic address associated with the user.

In particular, the cloud-based computing system may access and merge (or cause to be merged) certain content common to the plurality of entities with the custom content specified by the entity associated with the network resource locator (and which may optionally be unique to the entity). The merged content may then be rendered on a user display. The entry of the secure security access code into a corresponding field may be needed in order to initiate a transaction for a product.

In response to receiving the secure security access code, information regarding transactions conducted via the rendered merged content may be stored in association with a record corresponding to the entity. Related financial transactions may be processed using an account associated with the entity. Shipments of products for each of the plurality of entities to users may be made directly by the common manufacturer/product source. The given entity may then be automatically charged by the manufacturer for the product shipped to users.

The application used to conduct the transactions may be operated by the manufacturer of the product or product source (where the product source may actually specify the product to the actual manufacturer of the product, who may then supply the product source with the product).

Optionally, the common content and entity-specified content may be rendered by a dedicated application (sometimes referred to herein as an "app") downloaded to and hosted on a user system (e.g., a mobile device (e.g., a mobile phone, a tablet computer, a portable game console, a wearable, and/or the like), a desktop computer, a smart television, and/or the like). The app may optionally be configured to run in a browser (e.g., a mobile browser).

Thus, as will be described in greater detail herein, a data store may store content common to a first plurality of entities (e.g., names, images, and/or product descriptions of a given product offered by several distributors). In addition, each entity may independently specify content to be presented in combination with the common content. For example, a given item distributor (e.g., a medical service provider) may provide/enter unique product descriptive text and/or graphics (e.g., a name or trademark associated with the distributor) via a user interface or an electronic message. It is understood that as used herein, a distributor need not ever have possession or ownership of items being distributed.

By way of further example, a given distributor may optionally specify a value, such as a token value (e.g., a price in government issued currency, crypto-currency, loyalty points, etc.) for a given product that users (e.g., patients or other consumers) need to provide in order to obtain the product. Thus, different distributers may specify different token values for the same product. For example, a first entity may specify a first token value (e.g., a first dollar amount) and a second entity may specify a second token value (e.g., a second dollar amount). Both the first entity and the second entity may in turn be charged the same token value for the product even though they have set different token values for users (although they may be charged different token values). As similarly discussed above, a given entity may distribute an access code unique to the given entity to multiple users, which the users may utilize in order to access the associated token value (and/or other custom content of the entity) in addition to common content.

Thus, for example, when a first user (e.g., a consumer, such as a patient of a medical service provider) accesses an access code entry user interface (which may only include content common to the first and second entities and no content unique to either the first and second entities) via a user device, the first user may enter into a corresponding field a security access code associated with only one of the first entity or the second entity. The access code entry user interface (and other user interfaces described herein) may be served by a remote system or may be pre-stored on the user device (e.g., as part of an application installed on the user device).

For example, in response to the first user entering the security access code, a determination is made as to which entity the security access code is associated with. If a determination is made that the received security access code is associated with the second entity, then a second user interface may be rendered on the user device including common content (which would be rendered regardless of which valid access code was received) and content specified by the second entity (which may be accessed from the content data store).

The second user interface may include a control that initiates an acquisition process of the product. In response to the first user activating the control, the acquisition process may be conducted. The first user may be charged the second token amount in accordance with the content specified by the second entity. For example, the first user may be charged using a financial instrument previously entered by the first user into an account record. By way of further example, payment fields may be populated by the user device using corresponding payment information previously stored on the user device. Such mechanisms as APPLE PAY, GOOGLE WALLET, SAMSUNG PAY, or other services may be used.

Optionally, in addition to the second token value, the first user may be charged for shipping/handling and/or tax. A shipping/handling and/or tax token amount may be charged to the financial instrument associated with the first user and transferred (e.g., deposited into) to an account associated with the product source.

Optionally, the second token value from the first user may be directly transferred to (e.g., deposited into) an account associated with the second entity. Optionally, the product source may retain the shipping/handling charge to be used for shipping of the product to the first user. Optionally, the product source may immediately, or at a later time, charge the second entity the third token value (e.g., a third dollar amount), which may be transferred from an account associated with the second entity to an account associated with the third entity. Optionally different entities may be charged different token values for acquisitions made by users using respective entity access codes.

Certain examples will now be described with respect to the figures.

Referring to FIG. 1A, an example architectural environment is illustrated. A content customization and authentication system 114A may comprise a hosted computing environment that includes a collection of physical computing resources that may be remotely accessible and may be rapidly provisioned as needed (sometimes referred to as a "cloud" computing environment). The content customization and authentication system 114A may also include a data store described in greater detail herein. The data store is optionally a hosted storage environment that includes a collection of physical data storage devices that may be remotely accessible and may be rapidly provisioned as needed (sometimes referred to as "cloud" storage).

The content customization and authentication system 114A may be configured to enable certain authorized users (e.g., distributors/service providers) to specify custom (e.g., unique) content, store the custom (e.g., unique) content, and enable the custom (e.g., unique) content to be rendered on user system displays in conjunction with common content, as describe elsewhere herein. In addition, the content customization and authentication system 114A may execute certain processes described herein, or portions thereof. The content customization and authentication system 114A may provide authentication and encryption services to provide for secure communication and restricted access of content, such as the unique, custom content of distributors.

A plurality of disparate, distributed user systems 104A-1 . . . 104A-N may include standalone computers (e.g., desktop, laptop, tablet, smart phone, or other computer device), a centralized computer system, or a cloud computing system. The user systems 104A-1 . . . 104A-N may be associated with users/consumers of a product (e.g., a moisturizer, eye-drops, etc.). For example, a given user system 104A may include some or all of the following: a display (e.g., a touch screen display), a microphone, a speaker, processing devices, memory, wireless network interfaces and/or wired network interfaces. As will be described, the user systems 104A-1 . . . 104A-N may be configured to receive and render certain user interfaces, receive and transmit security access codes to the content customization and authentication system 114A, and conduct transactions over a network 102A (e.g., a wired network, a wireless network, an Internet Protocol network, and/or other network). The communications between the user systems and the content customization and authentication system 114A may be encrypted and decrypted by the user systems and the content customization and authentication system 114A.

A plurality of distributor systems 105A-1 . . . 105A-N (e.g., associated with service providers, such as medical service providers) may likewise include standalone computers (e.g., desktop, laptop, tablet, smart phone, or other computer device), a centralized computer system, or a cloud computing system. The distributor systems 105A-1 . . . 105A-N may be associated with distributors of a product provided by a product source. As will be described, the distributor systems 105A-1 . . . 105A-N may be configured to receive and render certain user interfaces, receive distributor specified content and transmit such content to the content customization and authentication system 114A, and conduct secure, encrypted transactions and communications over the network 102A.

A token transaction system 112A may securely communicate over the network 102A with one or more financial service provider systems 106A, 108A, 110A (e.g., bank systems, such as issuing banks, merchant banks) and with one or more other systems (e.g., content customization and authentication system 114A, one or more user systems 104A, one or more distributor systems 105A) to perform a payment transaction. The foregoing systems may include standalone computers (e.g., desktop, laptop, tablet, smart phone, or other computer device), a centralized computer system, or a cloud computing system.

Figure 1B:
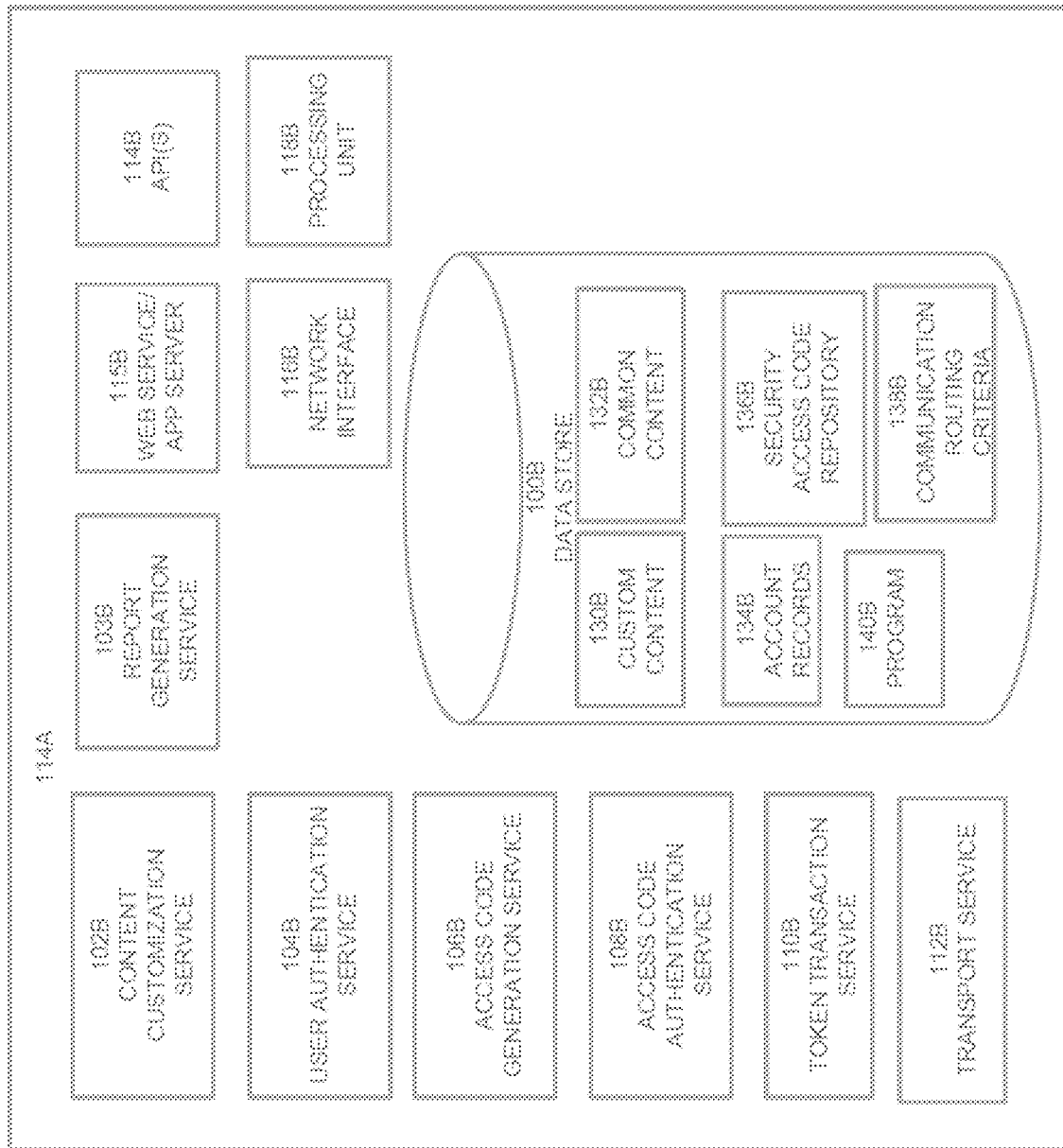
FIG. 1B illustrates a first system architecture.

With reference to FIG. 1B, an example content customization and authentication system 114A architecture is illustrated. A data store 100B is configured to store custom content 130B (e.g., specified by a distributor) in association with an identifier as to the source of a given item of custom content. As discussed elsewhere herein, different content may be presented in response to different security access codes. The data store 100B may also store common content 132B that may be presented regardless of the received security access code (e.g., as long as the received security access code is valid and associated with one distributor/service provider).

A security access code repository 136B may store security access codes in association with respective identifiers (which may optionally be the same identifier as stored in association with the respective custom content). Optionally, a security access code may be stored with an indication that the security access code is valid or that the security access code has been invalidated.

The data store 100B may also store account records 134B. For example a given distributor account record may store contact data, a financial account identifier, a record of items sales made to users that submitted the distributor's security access code, the amount received from the distributor for such sales, the amount owed by the distributor for such sales, a record of the items sold directly to the distributor for the distributor's inventory, the expiration date of items sold directly to the distributor, and/or the lot numbers of items sold directly to the distributor. By way of further example, an account record of an item provider may include contact data, a financial account identifier, location information (e.g., a physical address) associated with the item provider, an identification of the types of items (e.g., products and/or services) that the item provider has indicated (e.g., via a user interface) that the item provider provides, the amount received and/or owed to the item provider for items provided, and/or an identification of item requesters that received items from the item provider. The account records 134B may be stored in an encrypted form rather than in plain text format.

For example, the data in the account records may be stored using Full Disk Encryption (FDE), where the data is automatically encrypted when stored. Optionally, folder encryption or volume encryption may be utilized. Optionally, the encryption may be performed using dedicated hardware, using software, or a combination of dedicated hardware and software. Optionally, layered encryption is utilized, where data (e.g., sensitive data, such as financial account or medical data) may be encrypted upstream and/or downstream from the system storage (e.g., the data accessed or managed by the dedicated application hosted on the user systems 104). Optionally, encryption may be performed using application based encryption (under control of an application), file system based encryption (under control of an operating system), switch based encryption, appliance based encryption, host based encryption, HBA (host bus adapter) based encryption (under control of the network), storage controller-based encryption, drive based encryption, or other form of encryption.

A communication routing criteria repository 138B may store criteria (which may include one or more rules that need to be satisfied) that may be used to determine to which entity an item request is to be routed when there is more than one suitable entity available to supply a requested item. For example, the routing criteria may include location data, distance from destination data, availability of requested item and/or other criteria. One or more routing algorithms may be stored that may be used to select an entity among entities that meet a specified set of criteria. For example, the routing algorithms may include a round robin communication allocation algorithm (where the entities are selected in reverse order based on how recently an entity received an item request, so that the entity that has not received an item request for the longest period of time will receive the next suitable item request) and/or a random selection algorithm.

The data store 100B may also store program code 140B that when executed by a processing unit 118B (e.g., one or more microprocessor devices) may perform certain processes disclosed herein (including providing certain services disclosed herein).

A security access code generation service 106B may be configured to generate a new security access code when a new distributor account record is created. In addition, security access code generation service 106B may be configured to generate a new security access code for an existing distributor account record in response to detecting that a previous security access code has been compromised (e.g., obtained by a hacker as a result of hacking, posted to a content sharing website or other platform, or the like).

The security access code generation service 106B may be configured to generate a security access code using a random number generator configured to generate a security access code a specified number of characters long (e.g., 4 characters, 6 characters, 12 characters, or other number of characters). For example, the number of characters (e.g., 3-6 characters) may be set to make it easy to enter on a relatively small touch display (e.g., a 1 inch-7 inch phone display).

The security access code generation service 106B may be configured to generate a security access code limited to a specified character set or type of character (e.g., alphabetic characters, upper case alphabetic characters, lower case alphabetic characters, numeric characters, alphanumeric characters, Unicode characters). The security access code generation service 106B may be configured with one or more rules (e.g., do not permit the same character to be used more than a certain number of times, do not permit the same character to be used more than a certain number of times in a row, must include at least one number and one alphabetic character, do not generate a security access code already provided to a service provider, etc.).

The security access code generation service 106B may be configured to access a seed (e.g., the current time, words submitted by the service provider, rainbow tables, etc.) used to generate a given security access code. The security access code generation service 106B may optionally be configured to ensure that each seed is unique, and that the same seed may not be used more than once to ensure that each generated security access code is unique.

The new security access code may be encrypted prior to transmission to the distributor systems 105A using, by way of example, symmetric or asymmetric encryption (e.g., using public/private keys as described elsewhere herein). If symmetrical encryption is used, the decryption keys may be the same as the encryption keys. If asymmetrical encryption is used, the decryption keys (e.g., private keys) may be different than the encryption keys (e.g., public keys).

A user authentication service 104B may be configured to authenticate a user (e.g., an end user or distributor) accessing the content customization and authentication system 114A. Authentication may be performed on a user identifier and password received from a user system via a via a network interface 116C and/or using biometric data (e.g., fingerprint, face recognition, iris recognition, voice recognition, and/or the like). The user identifier, password, and/or other authentication tokens may be encrypted by the user system (e.g., the application executing on the user system) and decrypted by the content customization and authentication system 114A.

A security access code authentication service 108B may be configured to authenticate a security access code received from a user system 104A via the network interface 116C. For example, the security access code authentication service 108B may compare the security access code received from the user system 104A with those stored in the security access code repository 136B, and if a match is found, a determination may be made from an associated security access code validity indicator as to whether the security access code is valid. For example, if the received security access code matches a known valid security access code, the receive security access code may be identified as valid. If the received security access code does not match a known valid security access code, the receive security access code may be identified as invalid.

A customization service 102B may be configured to select custom content from the custom content 130B repository that corresponds to a user-entered validated security access code and optionally convert the custom content based on the user's profile (e.g., the user's billing or shipping address). For example, the custom content may be converted from a first language to a second language or from a first currency to a second currency. Such conversion may be automatically performed in response to determining or inferring a user location (e.g., based on an Internet Protocol (IP) address of the user system, GPS data associated with the user system current location, a user location selection, and/or the like). The custom content and the common content may be served as a document (e.g., as a web page or application user interface) via the web service/app server 115B using the network interface 116B.

A report generation service 103B may be configured to generate various reports, such as those described herein (e.g., profile reports, sales reports, consumer reports, etc.).

A token transaction service 110B may be configured to enable tokens to be transferred (directly or indirectly) from a user (e.g., a consumer) to a distributor for a given item obtained by the user, where the user provided a security access code associated with the distributor. The token transaction service 110B may be configured to enable tokens to be transferred from a distributor to the operator of the system 114A (which may be the source of the item) for items obtained by users that provided the security access code associated with the distributor.

A transport service 112B may be configured to cause an item to be shipped to a user or to a distributor (e.g., cause the user's shipping address to be printed on a shipping label or directly on a shipping container, cause the shipping label to be affixed to a shipping container, cause the item to be packaged in the shipping container, and cause the shipping container to be shipped via a selected shipping service to the user's shipping address).

One or more application programming interfaces 114B may be utilized to access data from third party systems (e.g., currency converter services, language translation services, etc.).

Thus, the content customization system 114A may provide authentication and encryption services to provide for secure communication and restricted access of content, such as the unique, custom content of distributors.

In particular, the communications from the user, service provider, or financial service provider devices/systems may be encrypted to prevent the communicated data from being accessed by an unauthorized entity. For example, the app or browser on the client-side (the user or service provider system) may initiate a handshaking message to the content customization and authentication system. The handshaking message may identify the cipher suites supported by the client and other cryptographic information (e.g., the maximum supported version of transport layer security or secure sockets layer, the client's order of preference). The handshaking message may optionally identify data compression methods supported by the client. The handshaking message may include a random byte string that may be used in generating encryption keys.

The content customization system 114A may respond to the client with a handshaking signal which identifies the cipher suite suit and encryption version (selected from those identified in the client handshaking message) that will be used. The content customization system 114A message may also include a session ID and another random byte string. The content customization system 114A may additionally transmit its digital certificate. The content customization system 114A may also transmit a client certificate request that identifies the types of certificates supported and the Distinguished Names of acceptable Certification Authorities (CAs), which the client may verify.

The random byte string transmitted by the client to the content customization system 114A may be utilized by both the client and the content customization system 114A to generate a secret key that may be used for encrypting subsequent message data. Asymmetric encryption may be utilized to generate a shared secret key. The random byte string itself may be encrypted with the content customization system 114A's public key.

By way of further example, a given item of data may encrypted using an AES-128 key or public key cryptography/asymmetrical cryptography. If symmetric encryption is used, than the encryption key and the decryption key may be the same key. If public key cryptography/asymmetrical cryptography is used, then a public key may be used to encrypt the data and a private key may be generated to decrypt the data.

Optionally, envelope encryption is utilized, which advantageously reduces the network bandwidth utilization load, as envelope encryption enables users and user systems to store, transfer, and use encrypted data by encapsulating its data keys (DKs) in an envelope (instead of encrypting/decrypting data directly with Customer Master Keys). Network bandwidth utilization is reduced as only the request and delivery of the smaller data key are transmitted over the network.

Figure 1C:
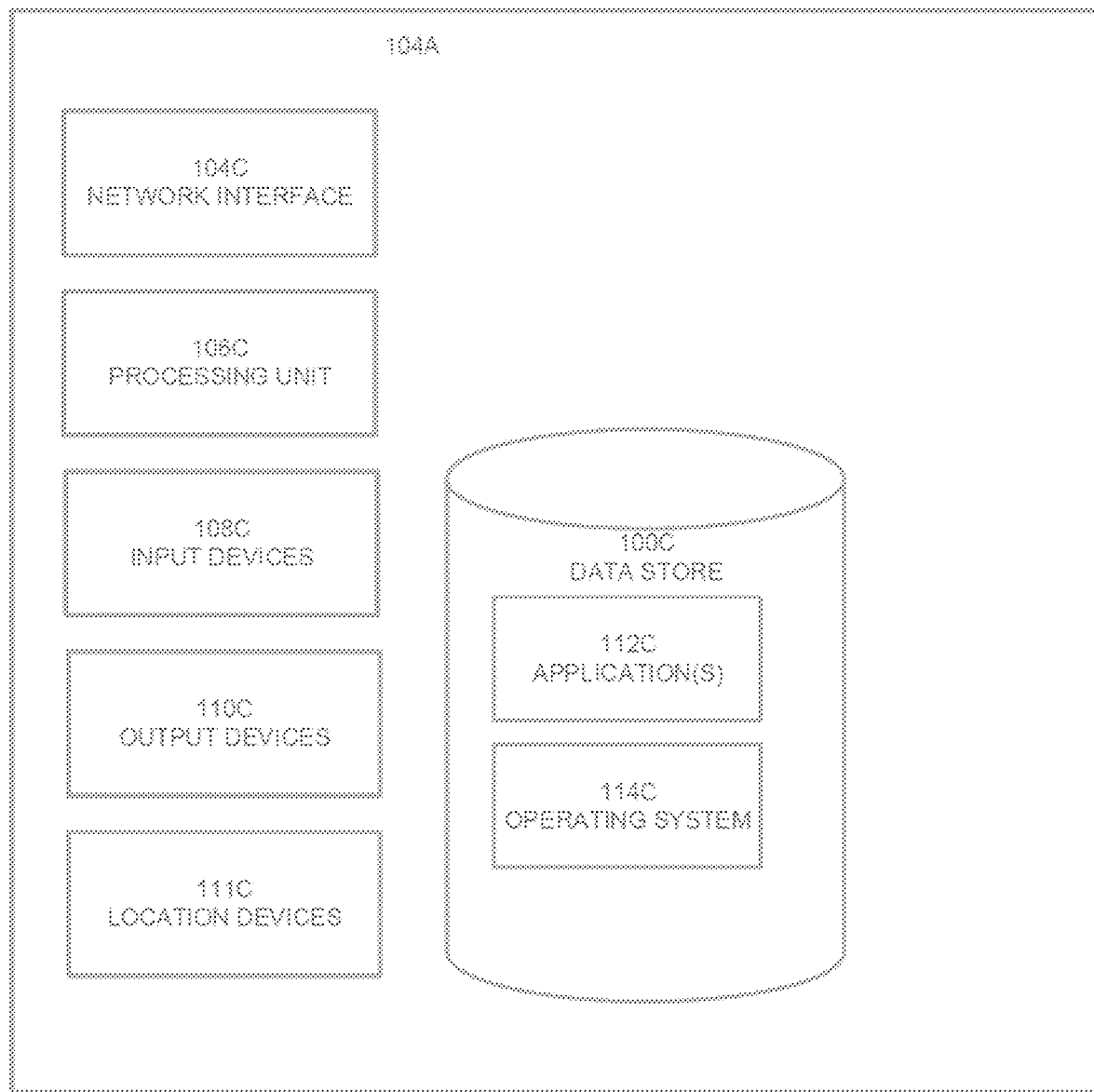
FIG. 1C illustrates a second system architecture.

With reference to FIG. 1C, an example user system 104A architecture is illustrated. The user system 104A hosts one or more applications 112C stored in a data store 110C. The applications may include a dedicated application (sometimes referred to as an "app") configured to communicate with the content customization and authentication system 114A, and cause certain user interfaces described herein to be rendered. The user system 104A includes in this example a network interface 104C, a processing unit 106C (e.g., one or more microprocessor devices) configured to execute program code, such as the operating system 114C code or application(s) 112C code, input devices 108C (e.g., touchscreen, keyboard, mouse, microphone, camera, touch pad, etc.), output devices 110C (e.g., speaker(s), display(s), haptic feedback device(s)), and location devices 111C (e.g., GPS radio, WiFi triangulation system, cell tower triangulation system, etc.).

Figure 2A:
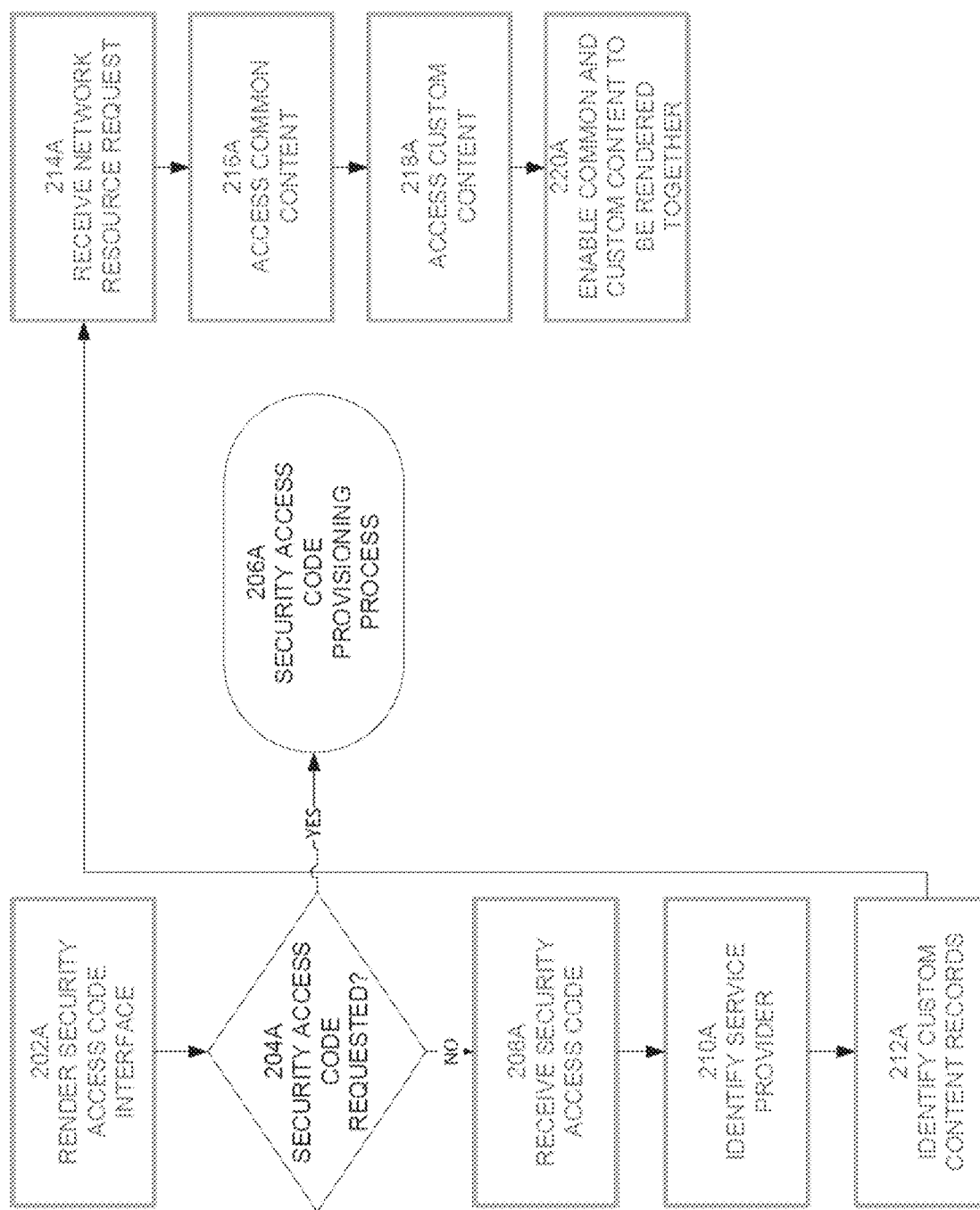
FIGS. 2A-2C illustrates example processes.

FIG. 2A illustrates an example process configured to enable a security access code to be used to access and render common and custom content. At block 202A, an interface configured to receive a security access code. The security access code may be numeric, alphabetical, or alphanumeric, by way of example. The security access code user interface may be rendered on a user device, such as that of a patient of a medical service provider (e.g., a physician). The security access code user interface may be rendered on a touch screen of a user device, and may include a virtual numeric, alpha, or alphanumeric keyboard, and may include a security access code field.

The security access code user interface may include a security access code request control, which may be activated if the user does not have the security access code for the service provider, or has forgotten the security access code for the service provider. If the user requests a security access code, the process may proceed to block 206A, wherein a security access code provisioning process may be executed, as described elsewhere herein.

If the user enters a security access code, at block 208A, the security access code may be received (e.g., by a content customization and authentication system). At block 210A, the security access code may be used as a query/lookup to identify, via one or more database records, a matching service provider to whom the security access code had been issued. At block 212A, custom content records specified by the identified service provider may be located and accessed from a custom content data store. The custom content may include a token value (e.g., a price in government issued currency, crypto-currency, loyalty points, etc.) a user needs to provide in order to obtain a corresponding item (e.g., a medication, salve, etc.). The custom content may also include text, still images (e.g., of the medical service provider), video images, audio content, and/or other content.

At block 214A, a network resource request (e.g., a URL access) may be received from the user device (e.g., via a domain server). For example, the request may be for data for a catalog of products being offered by the service provider or for a webpage providing all or a portion of a catalog of products being offered by the service provider. By way of further example, the request may be for an item detail page for a product offered by the service provider.

At block 216A, common content may be accessed from memory. The common content may include content that is common to two or more service providers. For example, common content may include the same images of products and the same textual product descriptions of products that are offered/being recommended by multiple service providers (e.g., multiple physicians). At block 218A, content customized by or for the service provider is accessed. For example, the customized content may include token values for products or videos provided by the service provider describing the product or use of the product. At block 220A, the common and custom content are displayed together in the same user interface.

Figure 2B:
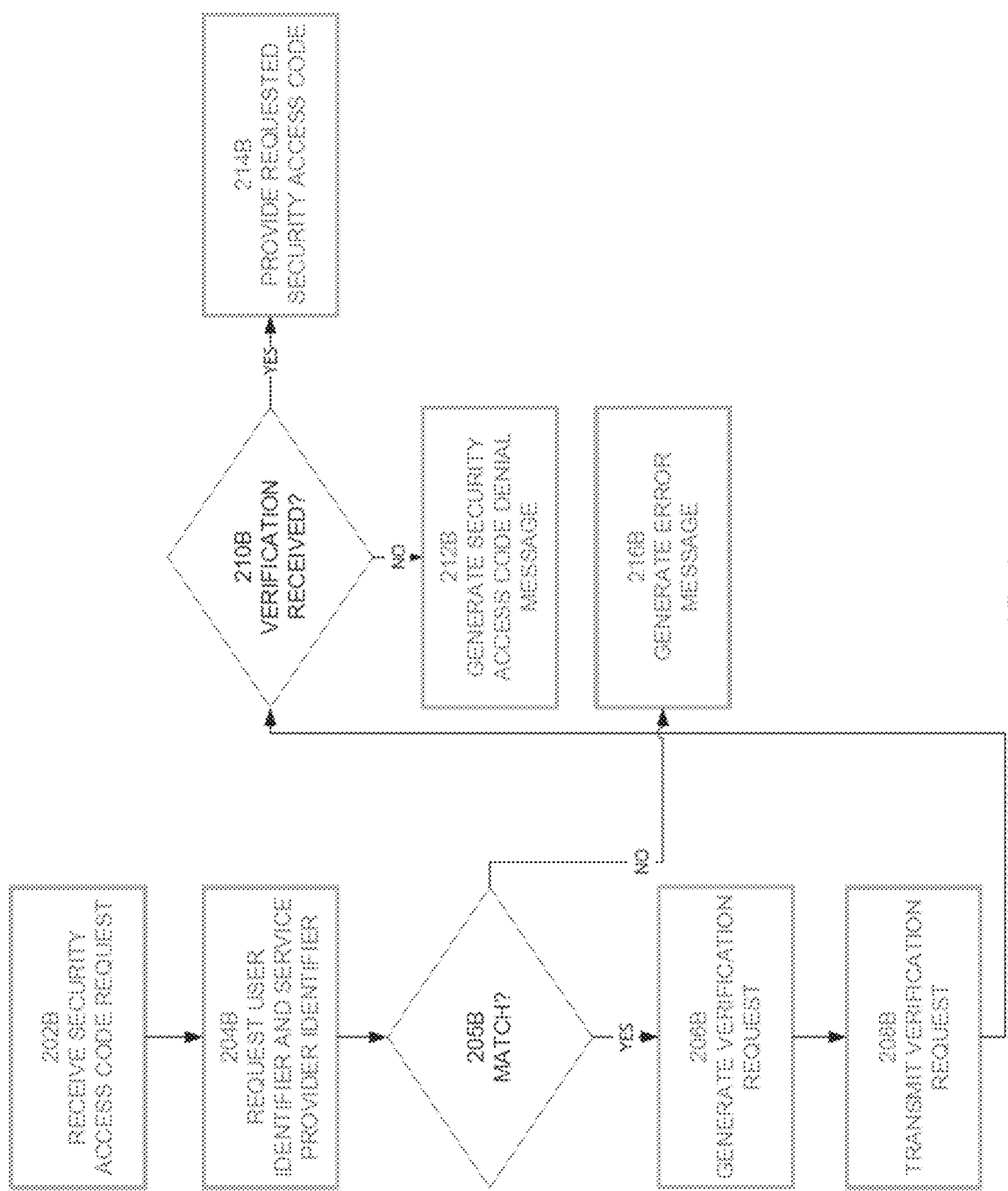

FIG. 2B illustrates an example process for the provision of a security access code to a user (e.g., a patient of a medical service provider) in order to enable the user to access documents that merge common content and custom content (e.g., content specified by a corresponding medical service provider).

At block 202B, a security access code request is received (e.g., by a content customization and authentication system)

over a network from a user device (e.g., the device of a patient of a medical service provider). For example, a user that wants to obtain an item (e.g., a medical-related product), recommended by a service provider (e.g., a medical service provider), may wish to access an electronic catalog page or detailed item description page that has been customized using service provider custom content. The request may include a user identifier (e.g., name, a portion or all of a social security number, a driver license, an email address, a phone number, a physical address, and/or other identifier) from the user.

At block 204B, an identifier provided via the user device (e.g., by the user via a user interface) is received, wherein the identifier is supposed to be associated with a provider (e.g., a medical service provider). Optionally, the identifier may be selected from a menu of medical service providers that have provider accounts with the system. Optionally, the identifier may be typed into a field or entered into the field by a voice entry via a speech-to-text service.

At block 205B, a determination may be made as to whether the provided identifier matches that of a provider account record. Such determination may optionally be skipped if the user selected the provider identifier from a menu of providers that are known to have account records. If the determination is performed, and no match is found, an error message may be generated and presented to the user that indicates that no matching record was found. The message may include a control that enables the user to communicate with a person or bot to attempt to identify a provider of the user.

If a provider record is identified, then at block 206B, a verification request may be generated to the provider, the verification request asking the provider to verify that the user is a client (e.g., a patient) of the provider. The request may include user identification data. At block 208B, the verification request is transmitted to the provider (e.g., to a provider system via an app, webpage, email, SMS message, or otherwise).

At block 210B, a determination is made as to whether a verification confirmation was received from the provider system. If a verification declined message is received from the provider system (or if no verification message is received from the provider within a specified time period, such as 1 day, 7 days, or other time period), an access code denial message may be generated and transmitted to the user (e.g., to a user system via an app, webpage, email, SMS message, or otherwise) for presentation to the user.

If a verification confirmed message is received from the provider system, the provider access code may be located and retrieved from memory. The provider access code may be transmitted, at block 214B, for presentation to the user (e.g., to a user system via an app, webpage, email, SMS message, or otherwise). The user may then utilize the security access code as discussed herein.

Optionally, rather than requesting that the service provider verify the user, at block 205B, in response to determining that the provided identifier matches that of a provider account record, the provider access code may be retrieved from memory and transmitted for presentation to the user (e.g., to a user system via an app, webpage, email, SMS message, or otherwise).

Figure 2C:
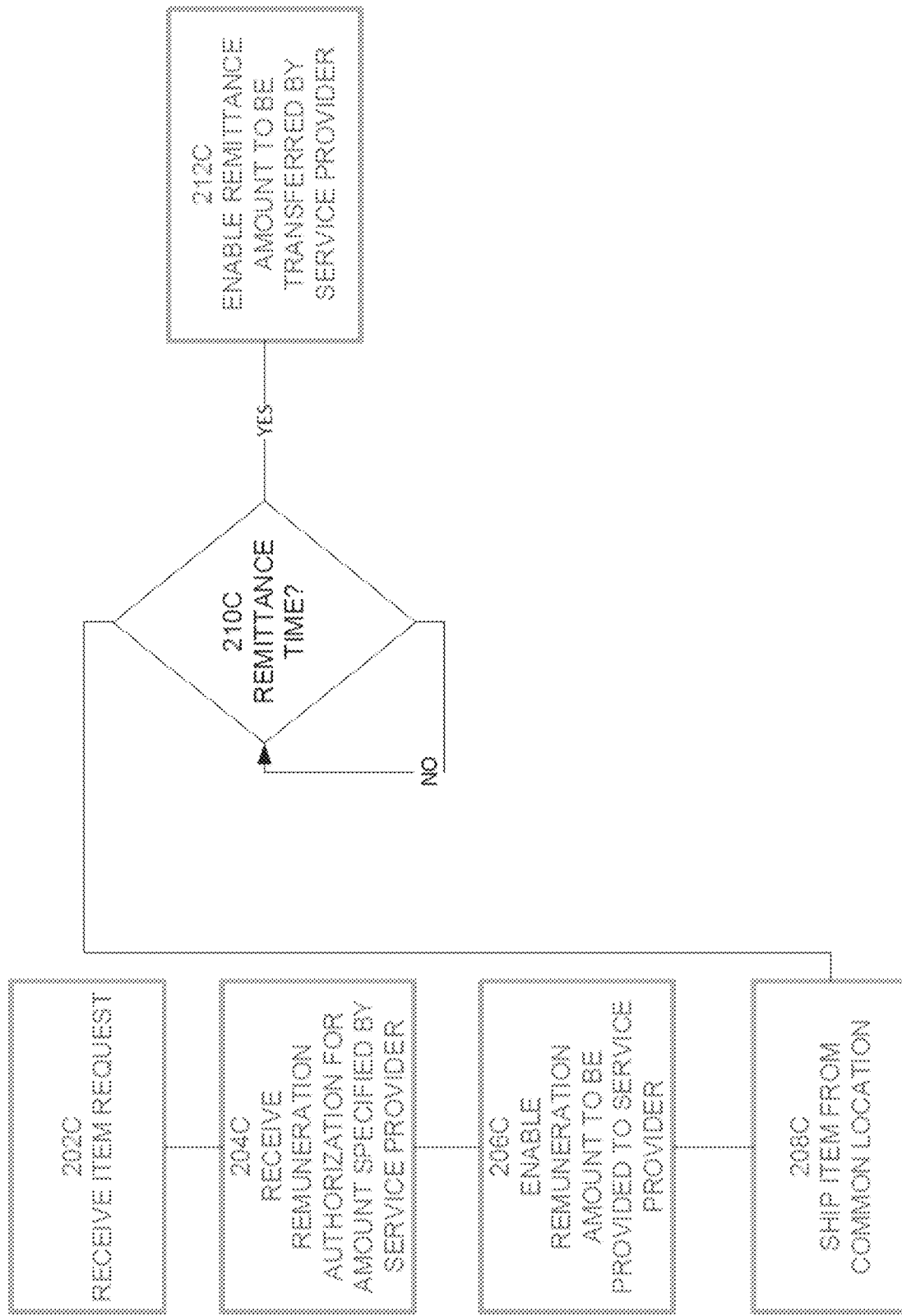

FIG. 2C illustrates an example transaction process involving a user (e.g., a patient), a distributor/provider (e.g., a medical service provider), and a manufacturer/system operator. At block 202C, an item request may be received at a system from a user (via activation of a control in an interactive document comprising common content and distributor custom content, where the interactive document is accessed partly in response to receiving a corresponding security access code). The interactive document may include a custom token amount specified by the distributor, where the item request includes an agreement to provide the token amount.

At block 204C, a user may be asked to provide authorization to charge or debit the token amount from an instrument of the user (e.g., a credit card, a debit card, a wire transfer, etc.), and if such authorization is received, at block 206C the process may enable the token amount may be transferred directly from the user to the service provider (without the manufacturer/system operator having access to the token amount or sensitive account data to thereby enhance security). At block 208C, the item may be shipped to the user from a manufacturer/system operator location. Thus, in this example process, the service provider does not at any time own or take possession of the item being shipped to the user. Further, in this example, the service provider has at this time not paid for the item bring shipped to the user.

At block 210C, a determination is made as to whether it is time for the service provider to remit a token amount to the manufacturer/system operator. The remittance time may be a specific date/day or range of days (e.g., the first week of the month after which the service provider received the user token amount).

The service provider remittance token amount may be for a different amount than the user token amount. For example, the service provider token amount may have been earlier agreed upon with the manufacturer/system operator, while the user token amount may be specified by the service provider. By way of illustration, the service provider token amount may be less than the user token amount. At block 212C, the service provider token amount may be transferred from the service provider (e.g., via a credit card, debit card, wire transfer, etc.) to an account of the manufacturer/system operator.

Certain example user interfaces configured to be presented on a user system (e.g., a system 104A) will now be described. The user interfaces may be provided via respective webpages accessed and rendered via a browser or may be accessed and rendered by a dedicated application. As will be described, efficient navigation from user interface to user interface is provided, thereby reducing the amount of back-and-forth navigation needed. In addition, certain content may be selected and filtered so as to reduce the amount of inapplicable or less relevant content presented (thereby making more display area available for more application and relevant content). Further, certain user interfaces may include a combination of common content and custom content of an entity, thereby reducing the storage that would otherwise be needed to store a complete new interface each time an item of content needs to be customized by an entity.

Figure 3B:
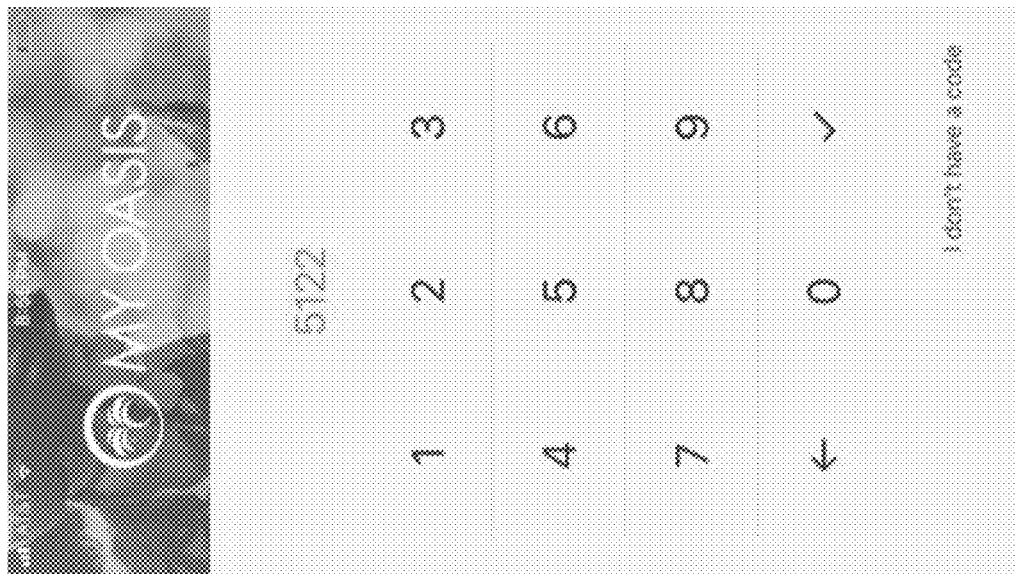
Figure 3A:
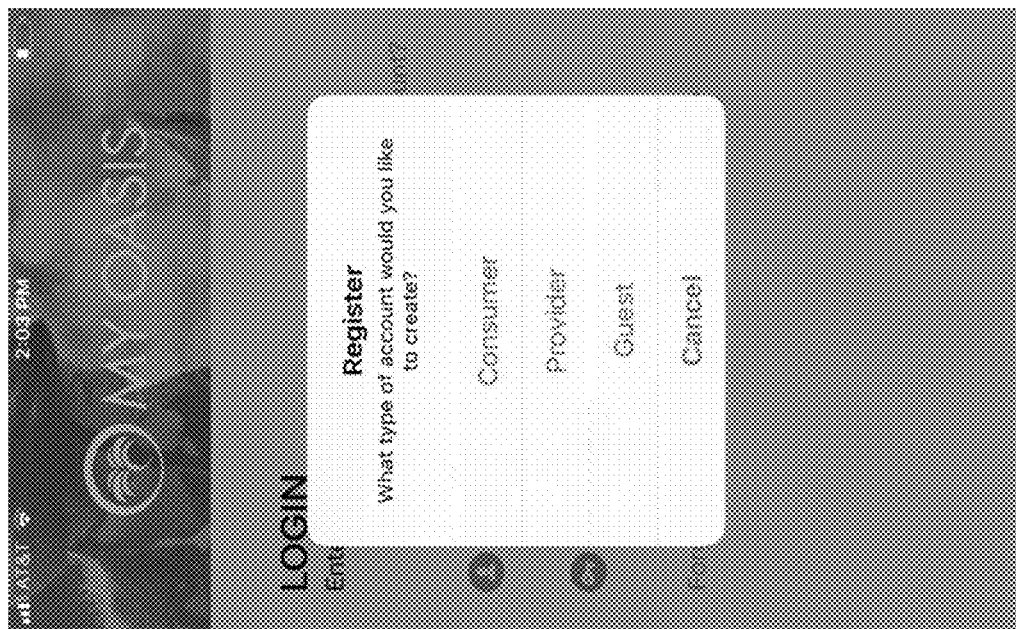

FIG. 3A illustrates an example role selection user interface via which a user can specify whether the user is a consumer, a provider (e.g., a medical service provider or other product distributor), or a guest (e.g., a consumer without a registered account). Based on the user selection, a corresponding set of user interfaces may be presented next. A role identifier associated with the user selection may be transmitted to the content customization and authentication system, which may utilize the role identification in determining how to process other data from the user and in determining what data and user interfaces are to be provided to the user.

Referring to FIG. 3B, an example authentication user interface is illustrated which may be presented in response to the user selected the consumer role via the example user interface illustrated in FIG. 3A. The authentication user interface is configured to receive an access code associated with a distributor. In this example, a number pad is presented in association with a backspace control and an enter control.

A security access code request control is provided via which the user may obtain a security access code if the user is not already in possession of a security access code. For example, if the security access code request control is activated, a security access code may be provided via the user interface or via a different communication channel (e.g., a voice communication channel, a short message service, an email, or otherwise). Thus, whether or not a user has a security access the user may, via the same screen, enter a security access code or request a security access code, without having to navigate to another screen.

Optionally, if the user requests a security access code, the user may be asked to provide or select (e.g., via distributor field or a distributor menu) a distributor (e.g., a medical service provider, such as a doctor). A confirmation request may be transmitted to the distributor (e.g., via an app hosted on a distributor device, via email, via text message, and/or otherwise). The confirmation request may include identification data provided by the consumer (e.g., name, social security number, driver license number, etc.). In response to receiving a confirmation from the distributor, the security access code may be proved to the consumer.

Figure 3C:
Figure 3E:
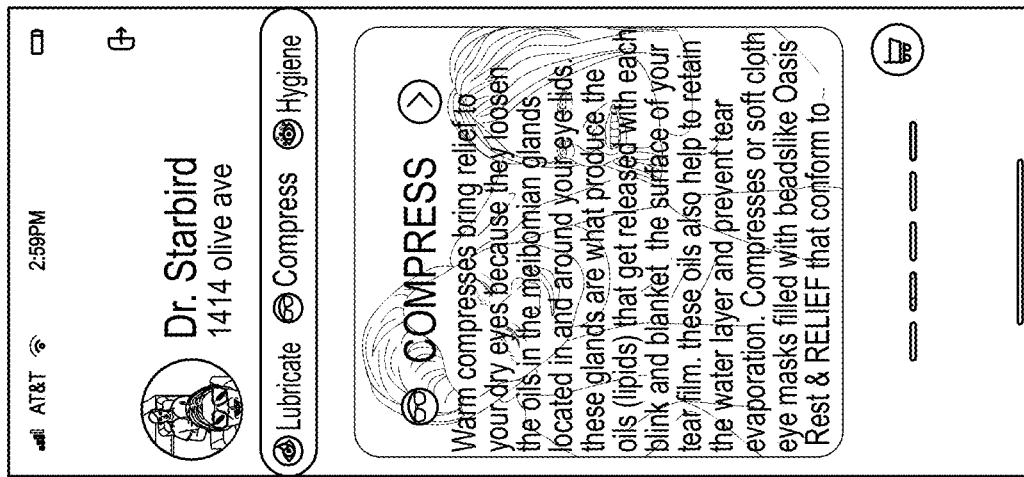

FIG. 3C illustrates an example interactive item catalog user interface. The displayed items may be filtered to only include items associated with the security access code entered by the user via the authentication user interface. For example, different distributors may distribute or recommend different sets of items (e.g., an ophthalmologist may recommend eye-related medications, while a gastroenterologist may recommend gastrointestinal medications). When a consumer/user enters a security access code the system may determine what items are associated with the security access code, and dynamically render a corresponding interactive catalog user interface. Thus, by filtering out items that are unavailable in conjunction with the security access code submitted by the consumer, network bandwidth utilization is reduced, display utilization is reduced, and the amount of consumer interface scrolling and navigation is reduced.

Each item entry may include an image of the item, a name of the item, a brief description of the item, a link to additional item data (e.g., presented via an electronic document), a token amount associated with the item, and/or a purchase/acquisition control. As previously discussed, certain of the content may be common to multiple security access codes and certain content may be unique to the security access code submitted by the user. For example, the token amount and/or description may be specified by the distributor associated with the security access code entered by the user.

A menu of item types may be presented (e.g., lubricate, compress, hygiene, etc.). In response to a user selection of a given menu item, a corresponding item catalog user interface (optionally filtered to include corresponding items of the selected item type associated with the security access code). Optionally, controls may be provided which when activate cause medical information related to the item type to be accessed and rendered (e.g., information regarding dry eyes for eye lubrication products, as illustrated in example FIG. 3B).

Figure 3D:
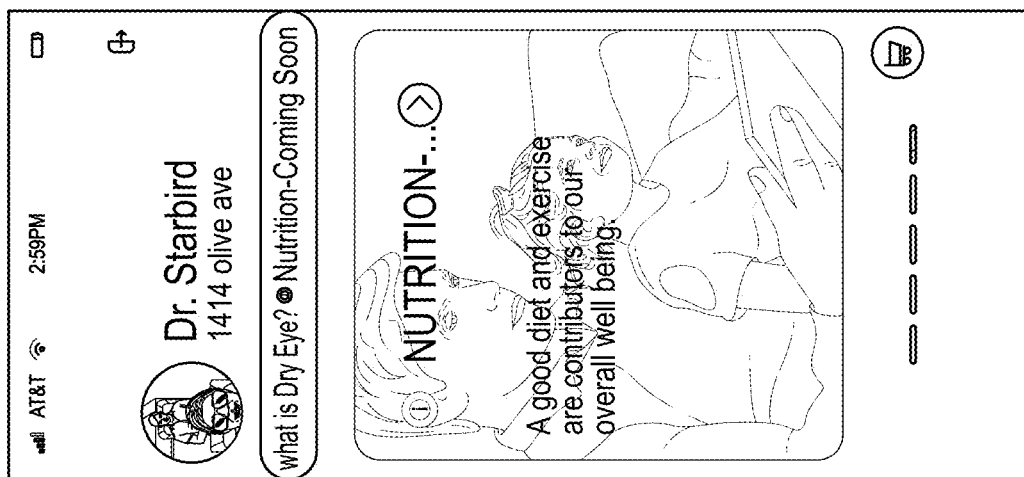

As illustrated in FIGS. 3D (nutrition), 3E (compress), 3F (hygiene), the medical information related to the item type may include images (e.g., photographs) of applicable items. Thus, the item images selected for display with the information may be limited to images of items relevant to the information and optionally, filtered to only include those items associated with the security access code. Optionally, each item image may be associated with an item detail interface for the corresponding item (see, e.g., as illustrated in FIG. 3G).

Figure 3G:
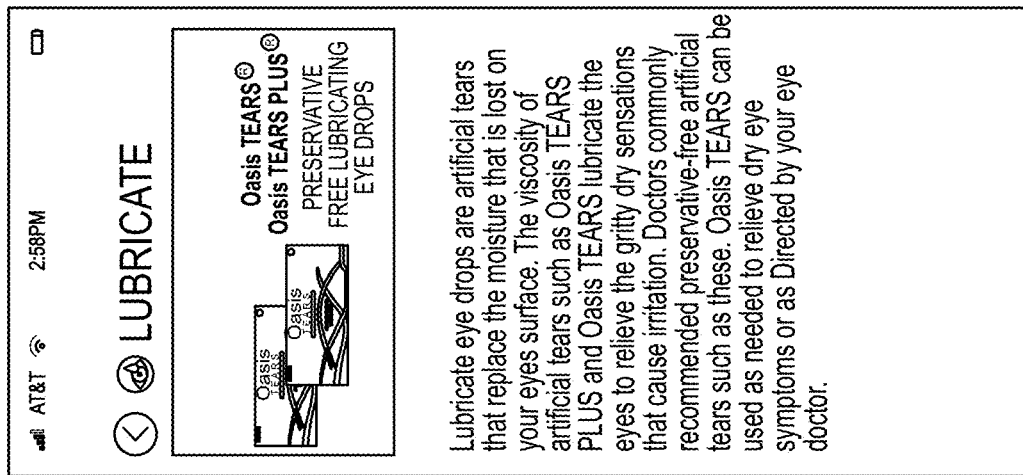
Figure 3F:

Referring to FIG. 3G, an example item detail interface is presented. The interface may include common content (e.g., an image of the item, the item name, description, and/or testimonial) presented via the item detail interface regardless of security access code, and custom/unique content associated with the provided security access code (e.g., token amount). A control may optionally be provided which when activated may cause the item to be added to a shopping cart associated with the user.

Figures 3H, 3I:
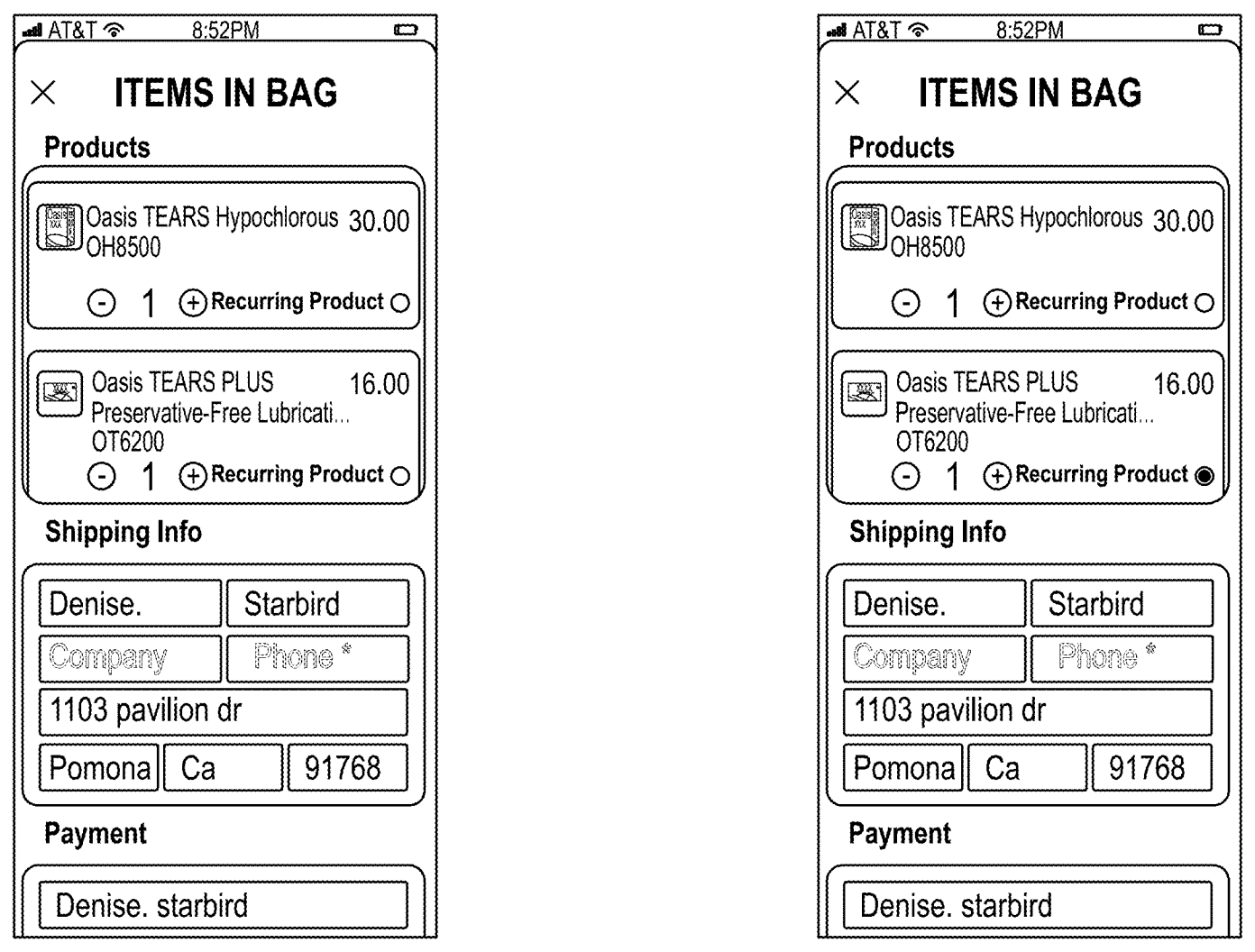

FIG. 3H illustrates an example shopping cart user interface via which an item is added. The user interface may display a corresponding token amount, shipping data (e.g., name, address), payment information (e.g., name, address, financial instrument/account number), subtotal, shipping cost, tax, total amount (e.g., total of item token amount, shipping cost, tax). The token amount may correspond to a customized value associated with the security access code provided by the user (the actual token amount specified by the corresponding distributor, or a conversion/translation thereof).

Optionally, a control may be provided which enables the user to subscribe to a particular item so that the item will be automatically shipped to the user at a specified period (e.g., weekly, monthly, every three months, every six months, etc.), where the user may be correspondingly periodically be charged, and the charged amount may be transferred to the distributor account.

In response to the user activating a recurring product control, the example user interface illustrated in FIG. 3I may be presented. The example user interface may list each subscribed to item (e.g., including item name and image), the next shipping date for the item, and an order cancellation control.

Certain example distributor user interfaces will now be described. The distributor user interfaces may be provided for display on a distributor system display in response to the user selecting the provider role (e.g., a medical service provider) in FIG. 3A. For example, the user interface may be provided by the content customization and authentication system 114A as a webpage and/or via an app installed on a distributor system.

Distributor account registration user interfaces may be provided via which the distributor may enter name, contact information (e.g., email address, practice address, phone number, etc.), profile image, background image, password, etc. In response to the distributor clicking on a submit/complete control, a confirmation message may be sent to the provider (e.g., via email, SMS message, or otherwise). The confirmation message may include a confirmation link which the distributor needs to activate (e.g., click on) to complete the account registration.

For example, additional user interfaces may be provided such as user interfaces via which the distributor can provide additional contact/billing information (or confirm previously provided contact/billing information), and indicate whether the registration is for a new or existing distributor account. In response to the distributor indicating that the distributor has an existing account, a field may be provided enabling the distributor to enter the distributor's account identifier. In addition, fields may be provided configured to receive an item manufacturer/product source contact name, indicate how the distributor heard about the manufacturer/product source, receive a tax resale number, and/or receive a tax exempt certificate number.

In addition, user interfaces may be provided via which the distributor can provide facility/practice (e.g., medical practice) data. For example, fields may be provided via which the distributor can enter partnership type, practice type (e.g., private or non-private medical practice), number of practice locations/offices, buying group purchasing organizations the distributor is a member of, etc. Fields may also be provided via which the distributor may enter the practice areas of the distributor, the number of practitioners in a given practice area, and the names of administrators (e.g., optometry, ophthalmology, surgery, lead surgical technician, clinic coordinators, office managers, etc.).

User interfaces may be provided via which additional business information may be received. For example, fields may be provided configured to receive a legal business name, mailing address, Federal Tax ID, business start date, description of products/services, an indication as to whether the business is a small business, an indication as to whether the business qualifies as a disadvantaged business, whether the business has ever accepted credit cards, etc.

In addition, interfaces may be provided configured to receive the names, titles, phone numbers, social security numbers, addresses, driver license numbers (and issuing state), percentages of equity ownership, and/or controller indications, for each person that directly or indirectly owns an equity interest above a specified percentage and/or has significant responsibility to manage or control the business (a controller).

Depending on the practice type, a user interface may be selected and presented to the distributor that is configured to receive additional information regarding the practice. For example, if the practice type relates to vision care, fields may be provided configured to receive the primary specialty of the practice, the secondary specialty of the practice, who the item provider is to contact for a periodic product review, which dry eye diagnostic tests are being used, an alternate email address for certain communications, other information regarding diagnostic or treatment equipment used by the practice, opt-in indications with respect to receiving new products, announcements, and/or account information, etc. A submit registration control may be provided, which when activated, causes the distributor provided information to be submitted and stored in a corresponding account record. A registration confirmation may be transmitted to the user submitting the registration and/or the distributor business email or SMS address.

Once the registration is completed, the registration may undergo a review process. Such a review process may include review of a payment application for the distributor. Optionally, the distributor's account will not be activated until the registration and/or the payment application are approved.

Figure 4B:
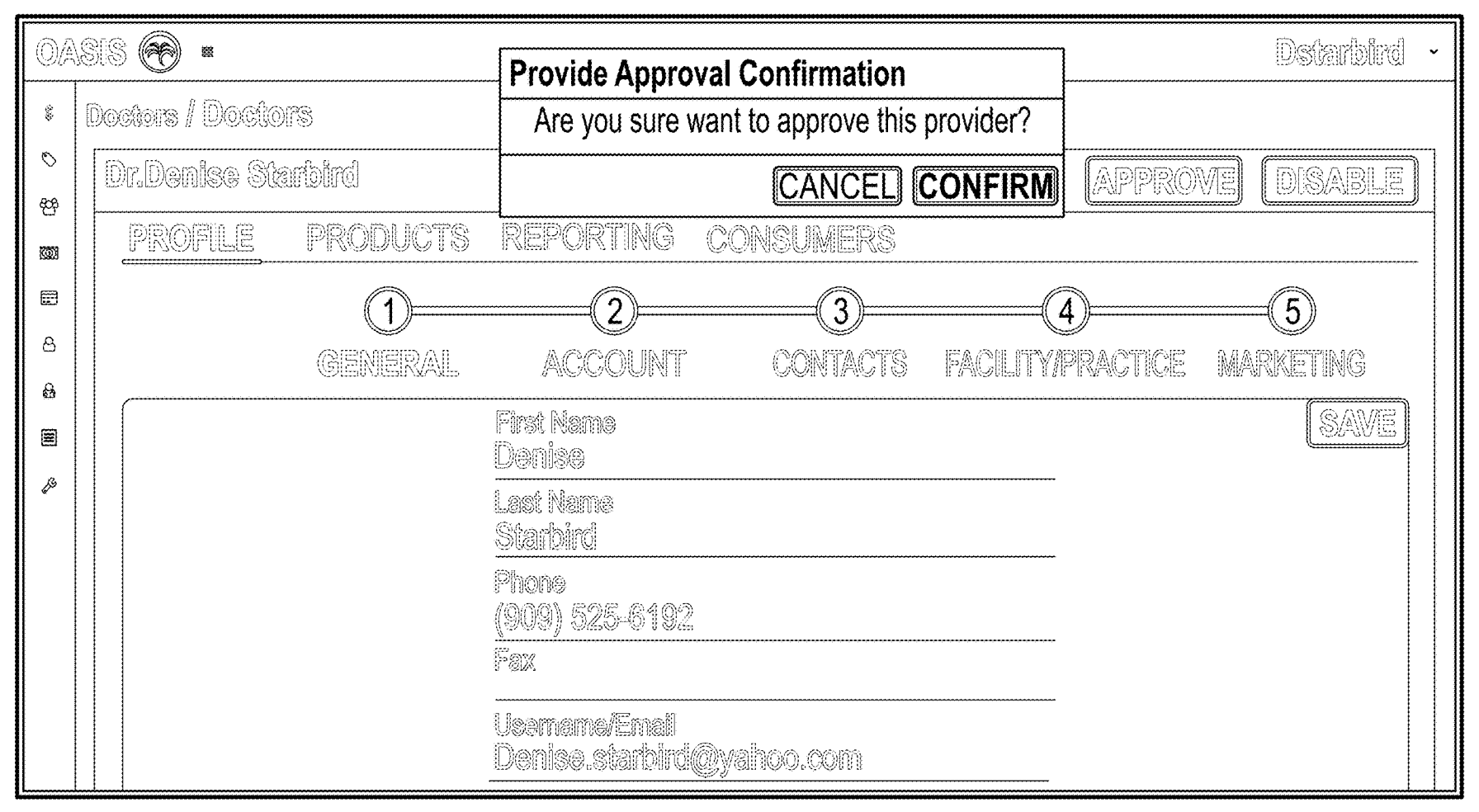

The review process may include a review of some or all of the registration data provided by the distributor. A queue of registrations and payment applications may be generated. An example queue interface is illustrated in FIG. 4. The queue interface may include a first name, last name, PIN (personal identification number), email address JDE (J.D. EDWARDS) ID, Confirmation status, Approval status, NLR Approval status, and date on which the applicant become a member. Optionally, an edit control may be provided, which when activated, enables user edits to some or of all of the presented of data. The edits may then be saved.

The queue may optionally be ordered by receipt date, alphabetically, by a JDE identifier number, by confirmation status (e.g., confirmed, unconfirmed), by approval status (e.g., approved, pending), by NLR approval status, or by date on which the applicant become a member. User controls may be associated for a given column enabling a user to command a corresponding sort order. The total number of queued matters may be determined and reported. A search field may be provided enabling a search query to be submitted. A search engine may receive the query, identify matching queued matters, and generate a ranked search result including the matching queued matters.

In order to ensure that an approval is not accidently submitted, an approval confirmation user interface (see, e.g., FIG. 4B) may be provided via including a confirmation control and cancel control, via which the confirmation control may be activated to confirm the approval or the approval cancellation control may be activated to cancel the approval.

A system (e.g., the content customization and authentication system 114A) may be configured to access various items of data and generate corresponding reports. The reports may be provided, by way of example, to a distributor or accessed by a content customization and authentication system administrator. For example, with reference to FIG. 4C, a dashboard for a given distributor may provide a profile interface, a sales record interface, and a consumer (e.g., patients) interface.

The profile interface may provide a summary regarding a given, selected distributor (e.g., a medical service provider), such as the distributor name, title, email address, phone number, and/or profile photograph. A view more control may be provided, which when activated, will cause additional profile data to be retrieved from memory and rendered for display.

The sales records interface may provide a sale history summary, such as total, aggregated historical sales by the distributor or total sales for a selected time period (e.g., the current year, the past 12 months, the current month, the current week, etc.). The consumer (e.g., patients) interface may provide a consumer summary, such as the total number of consumers that have acquired items using the distributor's security access code(s) for a selected time period (e.g., the current year, the past 12 months, the current month, the current week, etc.), or since account inception. A view more control may be provided, which when activated, will cause additional sales data to be retrieved from memory and rendered for display.

A table may be provided that lists all the products that the distributor offers/recommends to its consumers (e.g., patients), associated product codes, product categories, unit prices (charged to distributor), selling price (to the distributor's consumers), and corresponding product image. A view more control may be provided, which when activated, will cause additional consumer data to be retrieved from memory and rendered for display.

Figure 4D:
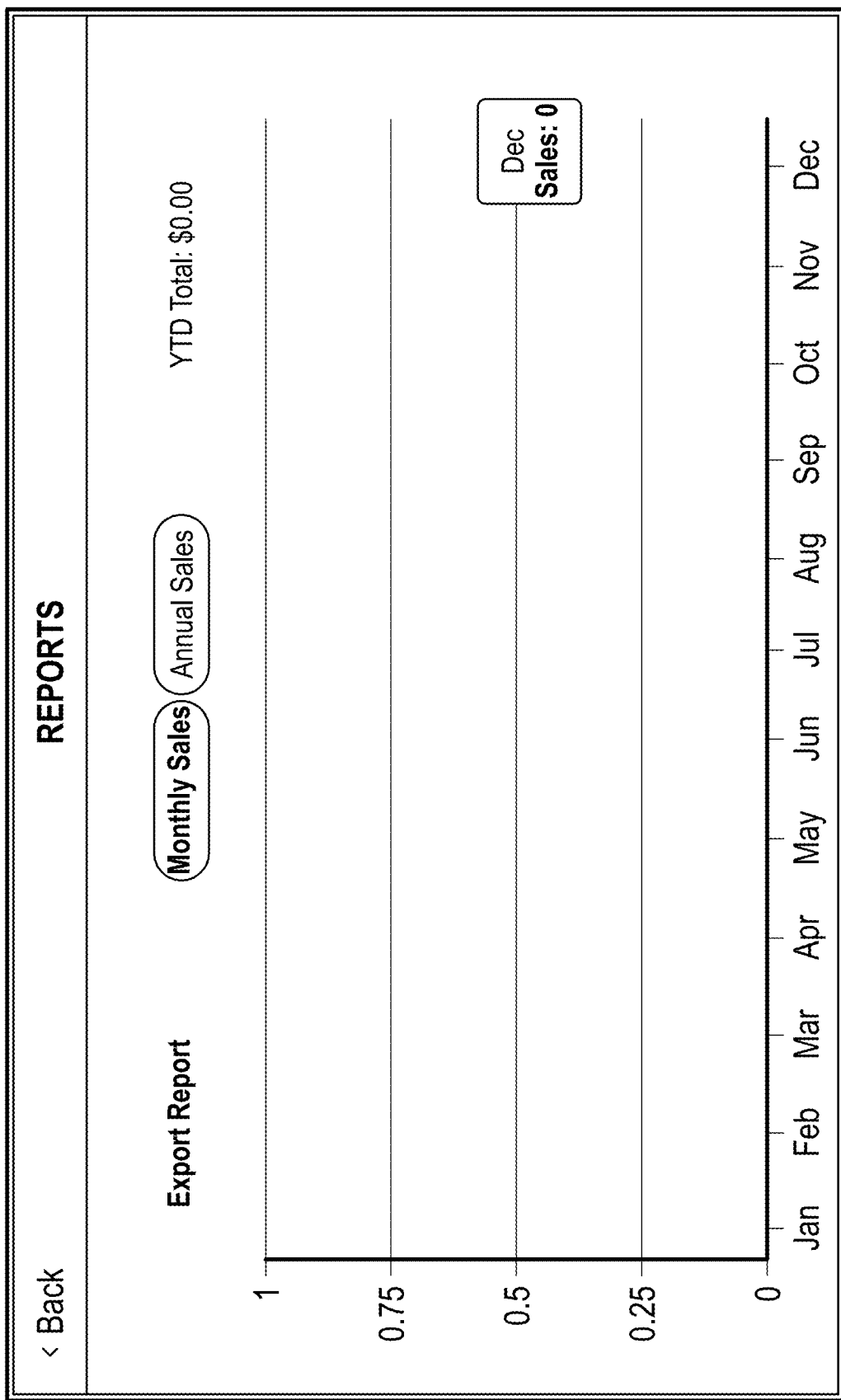

FIG. 4D illustrates a more detailed sales report, which may be generated in response to activation of the sale interface's view more control. For example, a graph may be generated showing sales over a selected time frame. Controls may be provided (e.g., a monthly sales control, an annual sales control, etc.) that enable the time period to be selected, and the graph is generated accordingly. Optionally, a sales summary may be generated and presented as well (e.g., a year-to-date total sales amount).

FIG. 4E illustrates a more detailed consumer report, which may be generated in response to activation of the consumer interface's view more control. For example, the report may list the names, identifier numbers, email addresses, and shipping address of each of the distributor's consumers (patients) that have purchased items.

FIG. 4F illustrates a more detailed profile report, which may be generated in response to activation of the profile interface's view more control. For example, the report may list the distributor's full name, email address, PIN code, profile image, store image, tax exempt certificate number, and business name. Optionally, an edit control may be provided, which when activated, enables a user to edit the profile data. The edits may then be saved in a corresponding profile record.

FIG. 4G illustrates an example user interface that enables item descriptions (e.g., regarding health-related products) to be entered and/or edited. The user interface includes a table that has an item name column, an item description column, a price column, an edit control column, and a disabled column, where each row corresponds to an item. For example activation of an edit control displayed in association with a given item enables text editing tools to be utilized (e.g., backspace, delete, entering of new text, etc.) In addition, the user interface enables token values (e.g., an item price charged to a distributor/service provider) associated with a given item to be entered and/or edited. The user interface further enables certain items to be "disabled" so that the item will not be displayed in an interactive catalog made available to distributors/service providers.

Figure 4H:
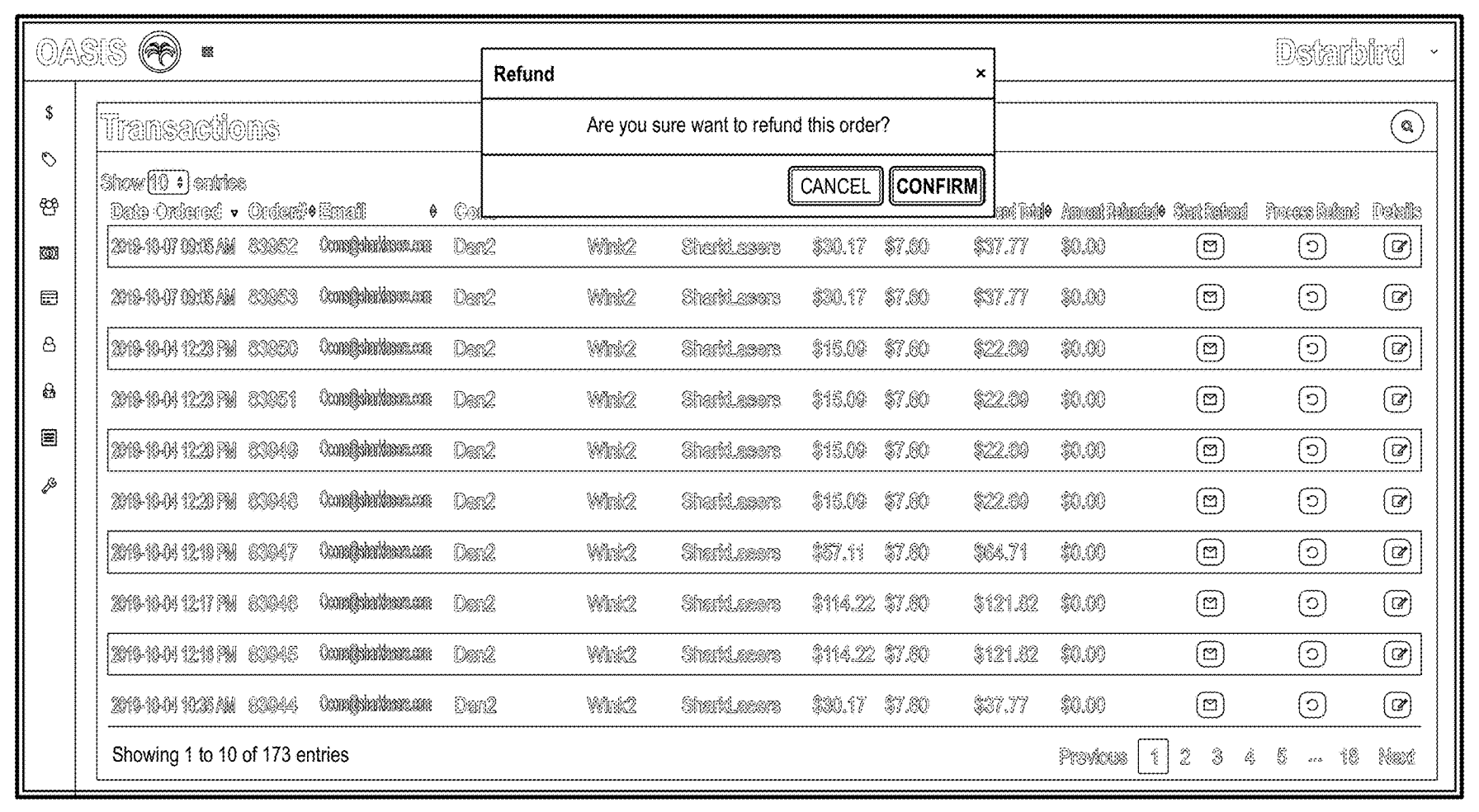

FIG. 4H illustrates an example user interface that enables item return requests to be processed. The user interface includes a table that has a date ordered column, an order number column, an email address of the refund requester, a contact name, a name of the distributor, components of the amount previously charged to the refund requester (e.g., unit price, shipping, tax, etc.), a total amount, the amount actually refunded, a start refund control, a process refund control, and a details control. Each row corresponds to an order. Activation of a start refund control associated with a given order starts the refund process. A prompt (e.g., a refund pop-up window) may be generated and displayed requesting the user to confirm that the refund for the corresponding order. In response to the user activating a confirm control, the refund to the refund requester may be provided. Alternatively, the user may activate a cancel control to cancel the refund process. Activation of the details control may cause order details to be accessed from memory and displayed.

A further example process will be described. As will be described, in this process a system may provide content describing one or more items that may be obtained using the system. The content may be displayed via a webpage served by the system, via a dedicated application installed on a device, and/or otherwise.

The system may route an item request communication (e.g., where the item may be a product or service) received over a network from a requester device (e.g., consumer) to a destination associated with an entity that may provide the item. The entity may be selected by the system using one or more routing criteria. The entity may specify a token amount needed to procure the item. The request may include or be associated with an identifier which may be used to identify the requester and/or a requester account. The identifier may be a unique code associated with an instantiation of the dedicated application installed on the user device and/or may be in the form of a UserID and/or password entered by the user into a login user interface by the requester (or by the requester device populating the log in form). A communication identifying the specified token amount may be transmitted from the entity device to the system and the requester device. Optionally, at this point, the identity of the requester is not transmitted to the entity.

If the requester agrees to obtain the item from the entity and provides payment instrument data with which to pay the corresponding token amount or instructions to a payment service to provide the corresponding token amount (e.g., credit card data, debit card data, cyber currency data, payment service instructions, wire transfer data, or other payment instrument data), the first system may provide requester identification information and location information to the entity. The first system may cause a portion of the token amount to be retained by the first system operator (e.g., a flat currency amount, a percentage of the token amount, or other portion) or other specified entity for providing the communication services, and may enable the remainder of the token amount to be securely transferred to the entity (e.g., to an account specified by the entity) using an encrypted communication channel.

Thus, advantageously, a common system, website, and content may be used to enable large numbers of item providers to offer a type of item to large numbers of users (e.g., consumers), thereby reducing the need for redundant systems (including redundant processors, memory, network interfaces, etc.), where each item provider would otherwise need dedicated content server systems and communication systems. Further, as described, communications amongst systems and devices may be performed using secure, encrypted communication channels thereby reducing the likelihood of improper access to the communications and data contained therein.

Figure 5:
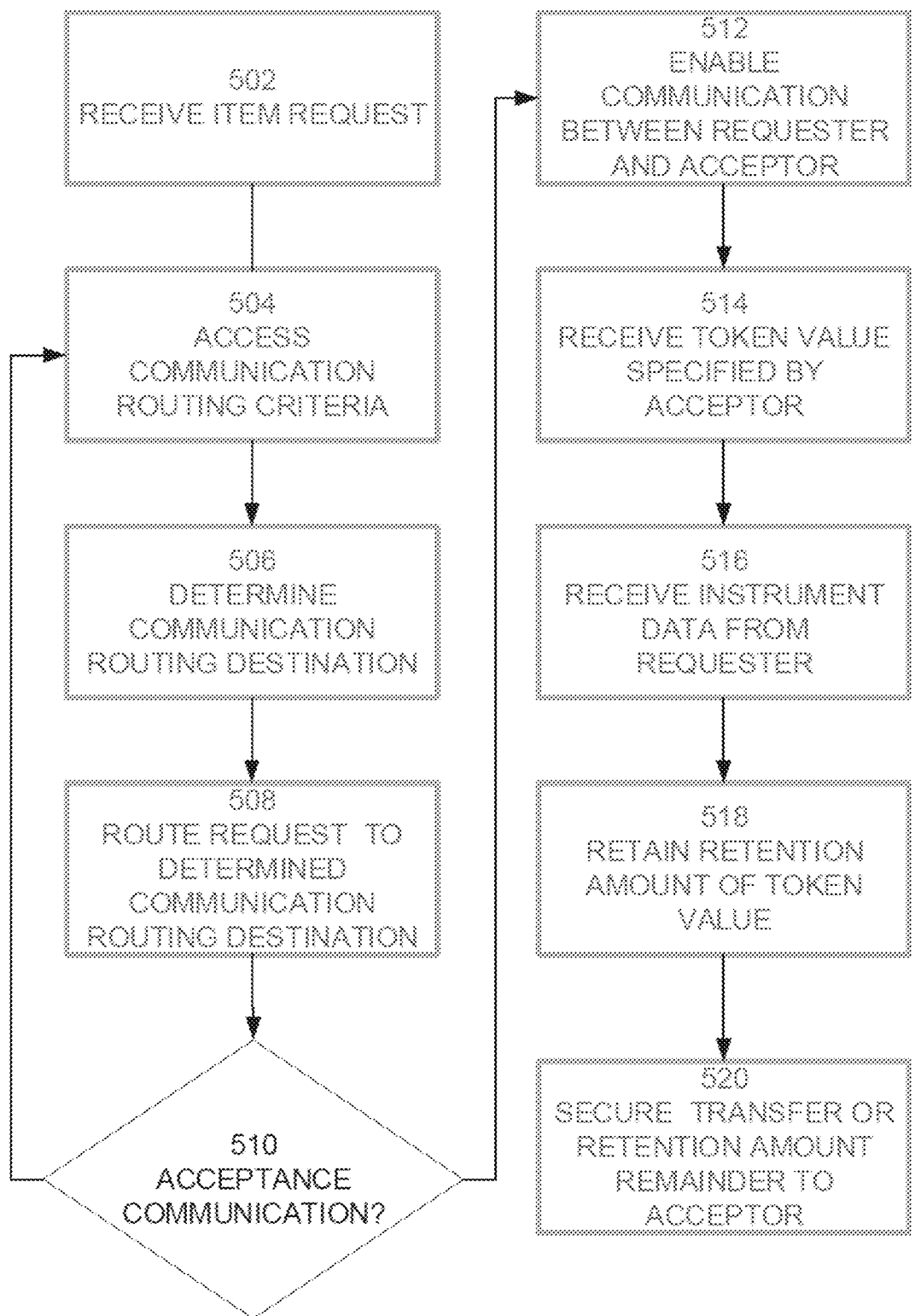
FIG. 5 illustrates an example process.

Referring now to FIG. 5, at block 502, an item request is received at a first system (e.g., content customization and authentication system 114A) over a network from a user device. The content request may be provided via a webpage served by the first system to the user device, via a user interface presented via an app installed on the user device, or otherwise. If different item types (e.g., different products or services) may be requested via the first system, optionally the requested item may be selected by the requester via a menu or catalog of items provided via a webpage or app. As noted above, an item may be a product or a service (e.g., a plumbing service, electrical service, a cleaning service, a delivery service, a repair service, a maintenance service, etc.).

The item request may include location data as to where the item is to be provided (e.g., an address of the requester). Optionally, the location data may be automatically accessed from a requester account stored in memory, may be received from a GPS radio on the user device, and/or may be manually entered by the requester via corresponding user interface fields.

If the item request is encrypted, the first system may decrypt the item request.

As similarly discussed above, communications between the first system, the user device, the item provider system, and/or financial service provider systems may be encrypted and decrypted by the respective devices/systems. For example, a communication may be encrypted prior to transmission to the first system using, by way of example, symmetric or asymmetric encryption (e.g., using public/private keys as described elsewhere herein). If symmetrical encryption is used, the decryption keys may be the same as the encryption keys. If asymmetrical encryption is used, the decryption keys (e.g., private keys) may be different than the encryption keys (e.g., public keys).

By way of further illustration, communications between or among the first system, the user device, an item provider system, and/or financial service provider system may be encrypted to prevent the communicated data from being accessed by an unauthorized entity. For example, the app or browser on the client-side (e.g., the user or item provider system) may initiate a handshaking message to the first system. The handshaking message may identify the cipher suites supported by the client and other cryptographic information (e.g., the maximum supported version of transport layer security or secure sockets layer, the client's order of preference). The handshaking message may optionally identify data compression methods supported by the client. The handshaking message may include a random byte string that may be used in generating encryption keys.

The first system may respond to the client with a handshaking signal which identifies the cipher suite suit and encryption version (selected from those identified in the client handshaking message) that will be used. The first system message may also include a session ID and another random byte string. The first system may additionally transmit its digital certificate. The first system may also transmit a client certificate request that identifies the types of certificates supported and the Distinguished Names of acceptable Certification Authorities (CAs), which the client may verify.

The random byte string transmitted by the client to the first system may be utilized by both the client and the first system to generate a secret key that may be used for encrypting subsequent message data. Asymmetric encryption may be utilized to generate a shared secret key. The random byte string itself may be encrypted with the first system's public key.

By way of further example, a given item of data may encrypted using an AES-128 key or public key cryptography/asymmetrical cryptography. If symmetric encryption is used, than the encryption key and the decryption key may be the same key. If public key cryptography/asymmetrical cryptography is used, then a public key may be used to encrypt the data and a private key may be generated to decrypt the data.

At block 504, request communication routing criteria are accessed from a data store that stores communication routing criteria. By way of example, there may be several entities capable of providing the requested item. The routing criteria may be utilized to determine to which entity the request communication is to be routed. For example, the routing criteria may include some or all of the following:

the entity has indicated that the entity provides the requested item, the distance from the requester location to the entity may not be greater than a specified threshold, the location of the entity must be in a geographical/governmental region specified by the requester (e.g., a specified zip code, city, state, etc.).

the entity has not been routed any of the past [specified number] of item requests.

The first system may store entity account records, where a given entity account record may include the location (e.g., address) of the entity, the type of items the entity provides (e.g., the types of services and/or products), and financial account information associated with the entity (e.g., to enable token amounts to be deposited in the entity's financial account).

At block 506, an entity is selected as the communication routing destination using the request communication routing criteria. Optionally, an entity may be selected from a group of entities that are first determined to meet certain criteria (e.g., the distance criteria, the location criteria and/or that have indicated that they provide the requested item) using a round robin selection process (in a fixed cyclic order) to ensure that item requests are fairly allocated among eligible entities. Optionally instead, the request may be randomly dispatched to a suitable entity that meets other criteria (e.g., that provides the requested item and/or the satisfies location criteria).

At block 508, the item request is routed over the network to the selected entity (e.g., via an app on the selected entity system, via a webpage accessed by a browser hosted on the selected entity system, via a messaging service (e.g., an SMS/MMS messaging service), via an email service, and/or otherwise. As noted above, the item request may be encrypted, and then may be decrypted by the system (e.g., via a browser, app, or hardware) of the selected entity's system. Optionally, identification and/or location information associated with the requester may be transmitted to the entity system.

At block 510, a determination is made as to whether the selected entity has transmitted a message to the first system indicating that the selected entity has accepted the request. Optionally, the message from the entity may include a specified token amount that the requester will need to provide for the requested item.

If the entity declined to supply the requested item, the process may proceed back to block 504 (or block 506 if the system still has the communication routing criteria in local memory), and a different entity may be selected.

At block 512, the first system may enable the selected entity to communicate (via the first system or otherwise) with the item requester. For example, the selected entity may communicate the token amount that the requester needs to provide in order to receive the item from the entity. If the token amount has not already been specified to the first system, the token amount may be received by the first system at this time. Optionally, the entity and requester may coordinate a time (e.g., a date and time of day) when the item will be provided. Optionally, once a time has been agreed upon, the time may be added to a calendar of the entity and a calendar of the requester. Optionally, the calendar may be hosted by the first system. Optionally, a calendar invitation with the time and the requested item specified may be transmitted to the entity and/or the requester, who may then accept the invitation which will add a corresponding entry onto third party calendar applications respectively associated with the entity and/or the requester.

At block 516, payment instrument data may be received from the requester device and/or otherwise. For example, optionally the system may transmit a message to the requester device asking the requester to identify a payment instrument and to provide authorization to charge or debit the token amount from an instrument or service of the user (e.g., a credit card, a debit card, cyber currency, a wire transfer, payment processor, etc.), and if such authorization is received, at block 518, the operator of the first system may retain a portion of the amount.

For example, the process may allocate and transfer a portion of the token amount to an account associated with the operator of the first system (or other specified entity) to compensate for the item request communication routing service and/or related services (such as those described herein).

The amount retained may be determined using one or more retention rules accessed from memory. For example, a retention rule may specify that a specified percentage of the token amount is to be retained. By way of further example, a retention rule may specify that a specified amount is to be retained regardless of the total token amount. Optionally, different rules may be specified for different types requested items (e.g., for different service types or product types). Optionally, different rules may be specified for different specified ranges of token amounts. For example, different retention percentages may be specified for different ranges of token amounts. By way of further example, different retention flat retention amounts may be specified for different ranges of token amounts.

At block 520, the remainder of the token amount (the specified token amount minus the retention token amount), may be transferred to an account associated with the entity.

Thus, as described herein, a common system may be utilized to store and render entity-specified content in conjunction with content common to multiple entities. The common system may be utilized to ensure the provision of entity-specified content is provided only to those having appropriate security access codes of respective entities. The disclosed methods and systems may be utilized to enhance secure transactions, while also reducing the amounts of repetitive, duplicative hardware and software that would otherwise be needed.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources, or may comprise a standalone system. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone or mobile application, computer application, a short messaging service message (e.g., SMS, MMS, etc.), instant messaging, email, push notification, audibly, via haptic feedback, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, microphone, camera, touch pad, etc.), network interfaces, etc.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. An authentication and encryption computer system, the authentication and encryption computer system comprising:
   one or more processing devices;
   a network interface;
   non-transitory memory that stores instructions that when executed by the one or more processing devices are configured to cause the computer system to perform operations comprising:
      maintain a data store comprising:
         first common content common to a first plurality of entities;
         and
         communication routing criteria;
      receive an encrypted communication comprising a first item request from a first user device of a first user, the first item request encrypted by the first user device;
      in response to receiving the first item request:
         decrypt, using a first key, the received first item request from the first user device;
         after decrypting, using the first key, the received first item request from the first user device, utilize communication routing criteria to select which entity, among a plurality of entities, the first item request is to be routed to,
         wherein the communication routing criteria comprise at least one of:
            location criteria comprising a geographical and/or governmental region,
            distance criteria comprising a physical distance relative to the first user, and/or
            how many item requests have been received since an item request has been routed to a given entity in the plurality of entities;
         cause the first item request to be routed to the selected entity, the selected entity selected utilizing the communication routing criteria;
         access a token amount specification from the selected entity;
         enable the token amount specification from the selected entity to be provided to the first user device;
         enable the first user to provide the specified token amount;
         access a token distribution rule that indicates that a first portion of the specified token amount is to be distributed to a first destination and that a second portion of the specified token amount is to be distributed to a second destination;
         cause the first portion of the specified token amount provided by the first user to be distributed to the first destination and cause the second portion of the specified token amount is to be distributed to the second destination in accordance with the accesses token distribution rule.

2. The authentication and encryption computer system as defined in claim 1, wherein the communication routing criteria comprise at least one of location or distance criteria.

3. The authentication and encryption computer system as defined in claim 1, wherein utilizing the communication routing criteria to select which entity, among a plurality of entities, the first item request is to be routed to, further comprises using a round robin communication allocation algorithm to select among entities that satisfy the communication routing criteria, an entity to route the first item request to.

4. The authentication and encryption computer system as defined in claim 1, wherein utilizing the communication routing criteria to select which entity, among a plurality of entities, the first item request is to be routed to, further comprises using a random allocation algorithm to select among entities that satisfy the communication routing criteria, an entity to route the first item request to.

5. The authentication and encryption computer system as defined in claim 1, wherein the authentication and encryption computer system is configured to store in memory data records associated with the first user and the selected entity using whole disk encryption and/or file encryption.

6. The authentication and encryption computer system as defined in claim 1, wherein the authentication and encryption computer system is configured to authenticate the first user using a unique identifier associated an application executing on the first user device, wherein the application is configured to transmit item requests.

7. The authentication and encryption computer system as defined in claim 1, wherein the authentication and encryption computer system is configured as a distributed cloud-based computing system comprising a plurality of cloud servers is configured to securely store and distribute item requests.

8. The authentication and encryption computer system as defined in claim 1, wherein the first destination is associated with an operator of the authentication and encryption computer system and the second destination is associated with the selected entity.

9. A computer-implemented method comprising:
   maintaining a data store comprising:
      first common content common to a first plurality of entities;
      and
      communication routing criteria;
   receiving, at a computer system an encrypted communication comprising a first item request from a first user device of a first user, the first item request encrypted by the first user device;
   in response to receiving the first item request:
      decrypting by the computer system, using a first key, the received first item request from the first user device;
      after decrypting, using the first key, the received first item request from the first user device, utilizing, by the computer system, communication routing criteria to select which entity, among a plurality of entities, the first item request is to be routed to wherein the communication routing criteria comprise at least one of:
    location criteria comprising a geographical and/or governmental region,
    distance criteria comprising a physical distance relative to the first user, and/or
    how many item requests have been received since an item request has been routed to a given entity in the plurality of entities;
causing, by the computer system, the first item request to be routed to the selected entity, the selected entity selected utilizing the communication routing criteria;
accessing a token amount specification from the selected entity;
enabling the token amount specification to be provided to the first user device;
accessing, by the computer system, token distribution criteria that indicates that a first portion of the specified token amount is to be distributed to a first destination and that a second portion of the specified token amount is to be distributed to a second destination;
using, by the computer system, the token distribution criteria to cause the first portion of the specified token amount provided by the first user to be distributed to the first destination and cause the second portion of the specified token amount is to be distributed to the second destination.

10. The computer-implemented method as defined in claim 9, wherein the communication routing criteria comprise at least one of location or distance criteria.

11. The computer-implemented method as defined in claim 9, wherein utilizing the communication routing criteria to select which entity, among a plurality of entities, the first item request is to be routed to, further comprises using a round robin communication allocation algorithm to select among entities that satisfy the communication routing criteria, an entity to route the first item request to.

12. The computer-implemented method as defined in claim 9, wherein utilizing the communication routing criteria to select which entity, among a plurality of entities, the first item request is to be routed to, further comprises using a random allocation algorithm to select among entities that satisfy the communication routing criteria, an entity to route the first item request to.

13. The computer-implemented method as defined in claim 9, the method further comprising storing in memory data records associated with the first user and the selected entity using whole disk encryption and/or file encryption.

14. The computer-implemented method as defined in claim 9, the method further comprising authenticating the first user using a unique identifier associated with an application executing on the first user device, wherein the application is configured to transmit item requests.

15. The computer-implemented method as defined in claim 9, the method further comprising using a distributed cloud-based computing system comprising a plurality of cloud servers to securely store and distribute item requests.

16. The computer-implemented method as defined in claim 9, wherein the first destination is associated with an operator of the computer system and the second destination is associated with the selected entity.

17. Non-transitory computer readable data media that stores computer executable instructions that when executed by a computing device, cause the computing device to perform operations comprising:
    maintaining a data store comprising:
        content common to a first plurality of entities; and
        communication routing criteria;
    receiving an encrypted communication comprising a first item request from a first user device of a first user, the first item request encrypted by the first user device;
    in response to receiving the first item request:
        decrypting, using a first key, the received first item request from the first user device;
        after decrypting, using the first key, the received first item request from the first user device, utilizing communication routing criteria to select which entity, among a plurality of entities, the first item request is to be routed to, wherein the communication routing criteria comprise at least one of:
            location criteria comprising a geographical and/or governmental region,
            distance criteria comprising a physical distance relative to the first user, and/or
            how many item requests have been received since an item request has been routed to a given entity in the plurality of entities;
        routing the first item request to the selected entity, the selected entity selected utilizing the communication routing criteria;
        receiving a token amount specification from the selected entity;
        enabling the token amount specification to be provided to the first user device;
        accessing token distribution criteria that indicates that a first portion of the specified token amount is to be distributed to a first destination and that a second portion of the specified token amount is to be distributed to a second destination;
    using the token distribution criteria to cause the first portion of the specified token amount provided by the first user to be distributed to the first destination and cause the second portion of the specified token amount is to be distributed to the second destination.

18. The non-transitory computer readable data media as defined in claim 17, wherein the communication routing criteria comprise at least one of location or distance criteria.

19. The non-transitory computer readable data media as defined in claim 17, wherein utilizing the communication routing criteria to select which entity, among a plurality of entities, the first item request is to be routed to, further comprises using a round robin communication allocation algorithm to select, among entities that satisfy the communication routing criteria, an entity to route the first item request to.

20. The non-transitory computer readable data media as defined in claim 17, wherein utilizing the communication routing criteria to select which entity, among a plurality of entities, the first item request is to be routed to, further comprises using a random allocation algorithm to select among entities that satisfy the communication routing criteria, an entity to route the first item request to.

21. The non-transitory computer readable data media as defined in claim 17, the operations further comprising storing in memory data records associated with the first user and the selected entity using whole disk encryption and/or file encryption.

22. The non-transitory computer readable data media as defined in claim 17, the operations further comprising authenticating the first user using a unique identifier associated with an application executing on the first user device, wherein the application is configured to transmit item requests.

23. The non-transitory computer readable data media as defined in claim 17, the operations further comprising using a distributed cloud-based computing system comprising a plurality of cloud servers to securely store and distribute item requests.

24. The non-transitory computer readable data media as defined in claim 17, wherein the first destination is associated with an operator of the computing device and the second destination is associated with the selected entity.

* * * * *